United States Patent Office 3,526,373
Patented Sept. 1, 1970

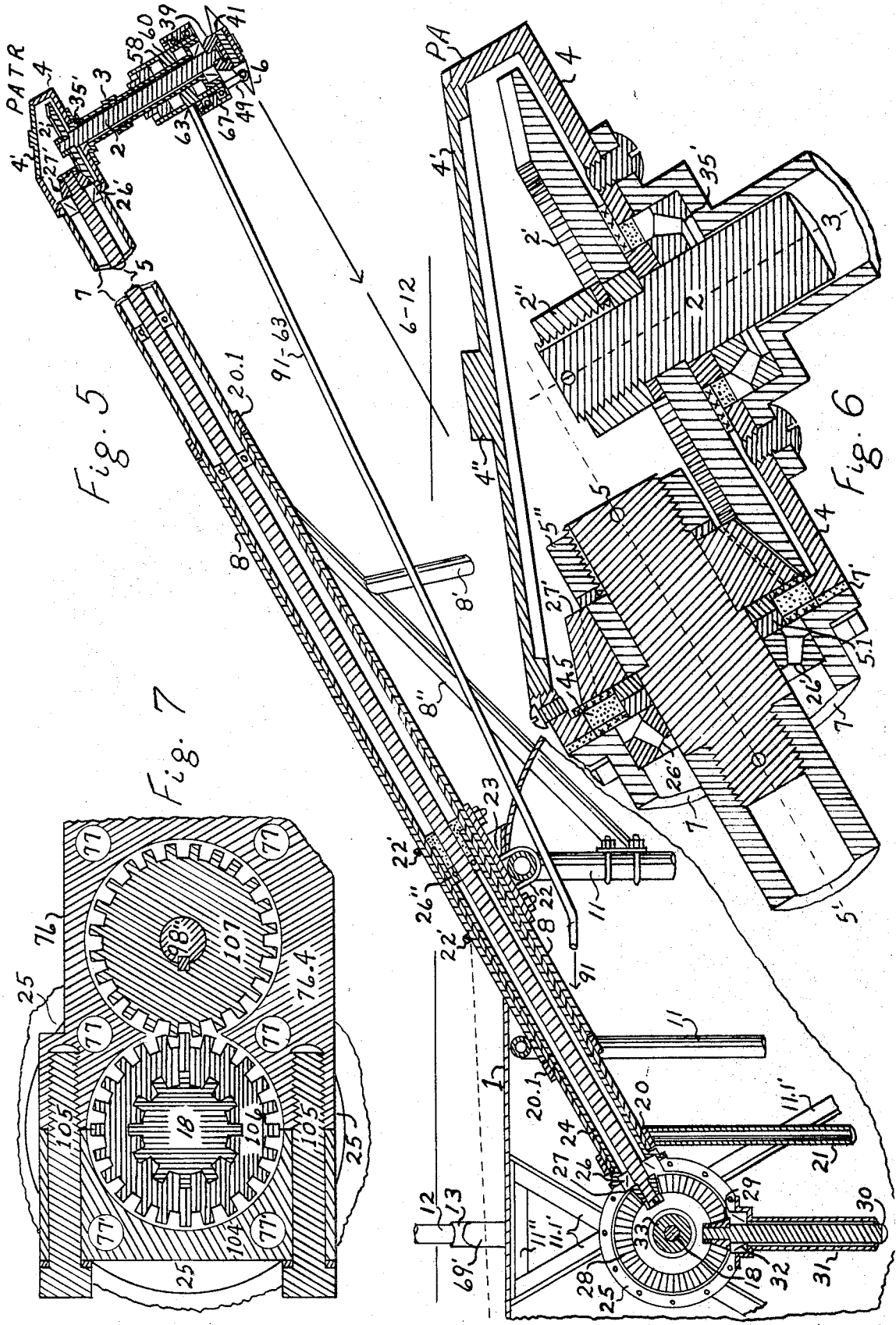

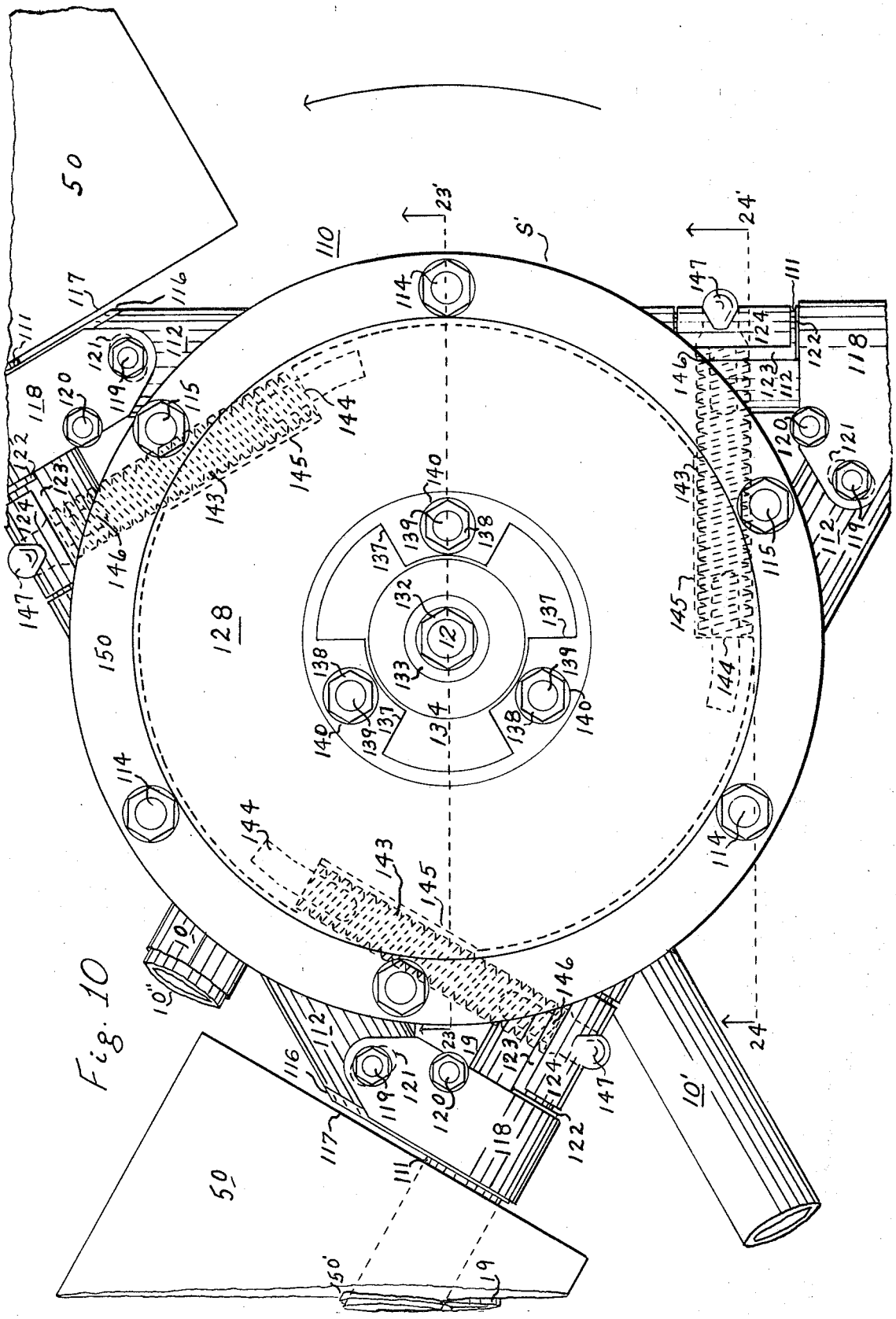

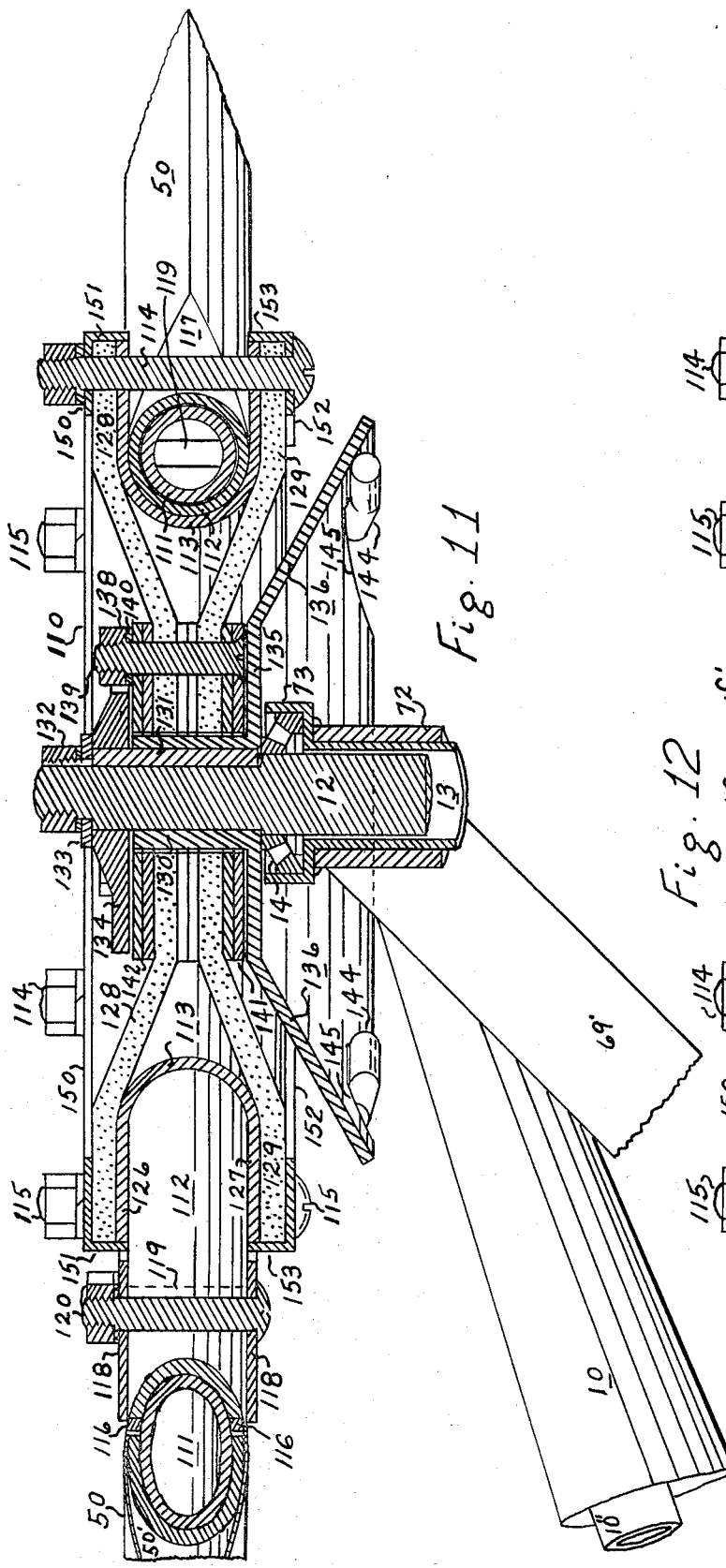

3,526,373
ROTARY WINGED AIRCRAFT
Frank W. McLarty, 337 S. Edgefield Ave.,
Dallas, Tex. 75208
Original application Oct. 4, 1957, Ser. No. 688,318, now Patent No. 3,273,653, dated Sept. 20, 1966. Divided and this application June 29, 1966, Ser. No. 562,935
Int. Cl. B64g 27/48, 27/54
U.S. Cl. 244—17.27                                    7 Claims

ABSTRACT OF THE DISCLOSURE

This invention relates to a rotary wing-type aircraft having paired sustaining rotors mounted side-by-side with respect to a fuselage, each rotor being flexibly mounted by a hub connected to a vertical shaft with means being provided for limiting relative movement between the blades of each rotor.

---

This application is a division of application Ser. No. 688,318, filed Oct. 4, 1957, now Pat. No. 3,273,653, issued Sept. 20, 1966, and is a complement to application Ser. No. 562,939, filed simultaneously as of June 29, 1966, with this application.

This invention relates primarily to hubs of rotors of aircraft lifted by airfoils mounted in said hubs on rotation of those hubs by means of their respective mounting shafts rotationally interconnected with the drive-shaft of an engine through an over-running clutch well known in the art and not claimed by me as my invention per se. While some of the features of these hubs can be utilized in the main sustaining rotor of a helicopter having its smaller auxiliary rotor, whose blades rotate in paths at angle to the rotational paths of the blades of the main sustaining rotor as a means of counteracting the torque of the engine on the mounting shaft of the larger sustaining rotor, the presently considered rotor hubs (now to be described as my invention and having the pitch of their blades mounted therein controlled entirely by the amount of torque of the engine on the rotor-mounting shafts) are intended primarily for mounting side-by-side in outrigger frameworks at considerable distances laterally from the fuselage, where other means of controlling the pitch of their rotor blades would be most complicated, particularly when the shafts mounting said paired side-by-side rotors have their outrigger frameworks pivotally oscillatable on a lateral axis with respect to the fuselage to which they are attached.

One object of my invention is to provide means of providing a substantially but not completely cantilever pivotal mounting of the cylindrical roots of the blades (having their respective longitudinal axes at least somewhat parallel to the respective axes of said blade roots) in the outer annular almost but not completely rigid member of the hub, while at the same time providing sufficient flexibility of said mounting of the blade roots in the outer annular hub member to minimize vibrational fatigue in the hub as well as in the blades, whose cylindrical roots are made long enough to absorb much of such vibration of the blades with respect to the hub.

A second object is to provide means attaching almost but not quite rigidly to said outer annular member of the hub resiliently flexible annular members of the same outer dimensions, whose circular inner margins are installed between the at least amount parallel annular flanges forming a spool in conjunction with the tubular cylindrical member to which they are rigidly attached, and which in turn is rigidly mounted on the upper tip of the rotatably mounted shaft, with respect to the axis of which the outer almost but not quite rigid annular member mounting the blade roots (by virtue of the resiliency of the stiff but flexible annular members mounting said outer annular member on said spool) can oscillate universally on multiple axes perpendicular to the axis of the mounting shaft by a few degrees and limited gradually in such universal oscillation by the stiffness of said resiliently flexible annular members, which also absorb some of the shock of the torque of the engine on the mounting shaft and in addition permit the outer annular hub member providing at least almost cantilever mounting of the blade roots to move slightly with respect to the mounting shaft axially, thereby absorbing shock on the blades in rough air in flight and absorbing shock on the mounting shaft and its bearings in the outrigger framework on landing of the craft.

A third object is to provide in rigid connection with the spool mounting the annular resiliently flexible members, which in flight permit the outer annular hub member mounting the blade roots to oscillate universally within gradually restricting limits with respect to the mounting shaft, an annular basically horizontal and very conical almost flat platform on which the lower one of said resiliently flexible annular members settles down quite gradually on landing to afford in consequence a broader base supporting the said at least almost rigid outer annular hub member, in which the blade roots have their substantially but not completely cantilever mounting, thereby giving the rotor and its rather long blades stability even in considerable winds, when the craft is parked on the ground.

A fourth object is to utilize in flight the resilient flexibility of the annular members mounting on the spool the outer annular hub member, in which the blade roots have their pivotal almost cantilever mounting, to stabilize the craft laterally by virtue of the gyroscopic action of the paired rotors, whose gyroscopic stabilizing tendencies are transferred to the respective rotor mounting shafts by the resiliently flexible annular connecting members without subjecting those mounting shafts to excessive vibrations as a result of those resiliently flexible connections between the blades of the respective side-by-side rotors and the respective spools attached fixedly to the respective tips of mounting shafts having very considerable spacing between bearings in the tubular housings of suitable length mounting them respectively in the outrigger frameworks having maximum strength for their minimum weight by virtue of the construction of said oppositely paired right and left mounted frameworks.

A fifth object is to provide a suitable means limiting within several degrees rotation of the resiliently flexible annular members with respect to the spool on which they are rotatably mounted and to utilize rotation of those resiliently flexible annular members (mounting the outer annular hub member in which the roots of the blades have their said pivotal almost cantilever mounting) within said limits of rotation as a primary component of the means regulating pitch of the blades (almost but not quite rigidly affixed to said respective cylindrical roots thereof) not only in case of complete engine failure but also in cases of substantial diminution of power of the engine (elected by the pilot or otherwise) by employment in cooperative conjunction therewith resiliently flexible coiled compression springs, whose rotationally rear tips respectively are mounted by suitable means attached to the aforesaid very slightly conical platform component of the spool, and whose rotationally forward tips are mounted on correspondingly opposed fingers attached to lugs fixedly attached, through gaps in the tubular brackets mounting the cylindrical blade roots, to the lower cylindrical walls of the respective blade roots, which thereby rotationally propel the outer annular member of the hub in which said roots are mounted and simultaneously in conjunction are regulated as to pitch by the compression of the respective coiled compression springs, both individually and cyclically as well as in unison in response to the amount of torque (as well as complete lack thereof) of the engine on the rotor mounting shaft and the spool fixedly mounted on the upper tip thereof.

A sixth object is to provide a rotary wing aircraft having inversely paired at least right and left rotors, mounted on substantially parallel shafts, turning in opposite directions in suitable bearings mounted at equal distances from a fuselage between them, rotationally interconnected by suitable gears and shafts extending into said fuselage at substantially right angles to the shafts mounting the said rotors, each of which has more than two blades rotating in the same orbital path and having their respective cylindrical roots disposed at at least very slight equal fixed angles with respect to the respective longitudinal axes of said blades, whose said roots are pivotally oscillatable respectively within limits of several degrees in tubular housings having almost but not necessarily completely cantilever mounting at equal peripheral distances from each other in the aforesaid outer annular at least almost rigid member of a hub, in which the pivotal axes of the blade roots in their respective tubular mounting brackets are disposed at equal distances from the rotor-mounting shaft and tangential to said shaft at suitable distance therefrom, and relative to which said outer annular hub member is slightly movable axially as well as universally about the axis of said mounting shaft on multiple axes perpendicular thereto within gradually restricting limits imposed by the stiff resiliency of annular flexible members almost rigidly bolted to said almost rigid outer annular hub member and having their inner margins disposed between the somewhat parallel annular flanges of a cylindrical spool mounted fixedly on said shaft whereby the rotor is turned in normal powered flight by a prime-mover engine in the fuselage.

Other objects will be apparent from a reading of the following exposition of the construction and cooperative working of the several parts in conjunction with the attached following drawings, in which like numerals refer by way of designation to like parts in the several drawings with which they are associated in the specifications.

FIG. 1 is a top plan view of a relatively small aircraft having two rotors S and S' having resiliently flexible hubs mounted on parallel shafts rotatable in opposite directions in outrigger frameworks and equally spaced from the vertical plane including the longitudinal axis of the somewhat cylindrical and horizontally disposed fuselage and rotatable in opposite directions in said outrigger frameworks having minimum resistance to downdraft of air and somewhat rigidly attached to the sides of said fuselage, from which said shafts are spaced sufficiently to make only the tips of the rotor blades retreat rearwardly over the laterally arched roof of the somewhat cylindrical fuselage normally somewhat horizontally disposed.

FIG. 2 is a top plan view of an alternative horizontally disposed much longer generally cylindrical fuselage to which are attached outrigger frameworks corresponding generally to those shown in FIG. 1 with similar resiliently flexible hubs for the front pair of rotors S and S' but having another pair of rotors S.1 and S.1' mounted in their corresponding outrigger frameworks at equal distances from the vertical plane containing the longitudinal axis of the longer generally cylindrical fuselage somewhat horizontally disposed.

FIG. 5 is a vertical cross section through the axis of the shaft mounting the fuselage-tilt control rotor P shown in FIG. 1.

FIG. 6 is a fragmentary vertical longitudinal cross section at much larger scale to show details of a suitable mounting of the bevel gears in the tail rotor gear box.

FIG. 7 is a fragmentary detail vertical cross section perpendicular to the axis of a drive-shaft within the fuselage rotationally interconnected with the shafts mounting the side-by-side mounted main sustaining rotors S and S' of FIGS. 1, 3, 4 and 5.

FIG. 10 is a top plan view of the hub of rotor S' shown mounted on the right side of the rotary wing aircraft having paired side-by-side mounted main sustaining rotors S and S' shown in FIG. 1 of my copending application Ser. No. 688,318 filed Oct. 4, 1957.

FIG. 11 is a vertical lateral cross section through the axis of the rotor hub shown in FIG. 10 along line 23–23' thereof.

FIG. 12 is a vertical lateral cross section through the rotor hub shown in FIG. 10 along line 24–24' thereof.

FIG. 16 is a detail vertical lateral cross section through the center of one of the alternatively segmented cylindrical vertically disposed mounting sleeves attached to the respective upper tips of the diagonally disposed bracing members mounted adjacent the respective upper tips of the upright tubular housings mounting the respective shafts of the main sustaining rotors.

FIG. 17 is a detail elevation of a suitable means of almost rigidly attaching the tips of aligned bracing frame truss members to the respective lateral tubular horizontal drive-shaft housings constituting primary segments of the outrigger frameworks on which the side-by-side main sustaining rotors are mounted rotatably.

Figure 1:
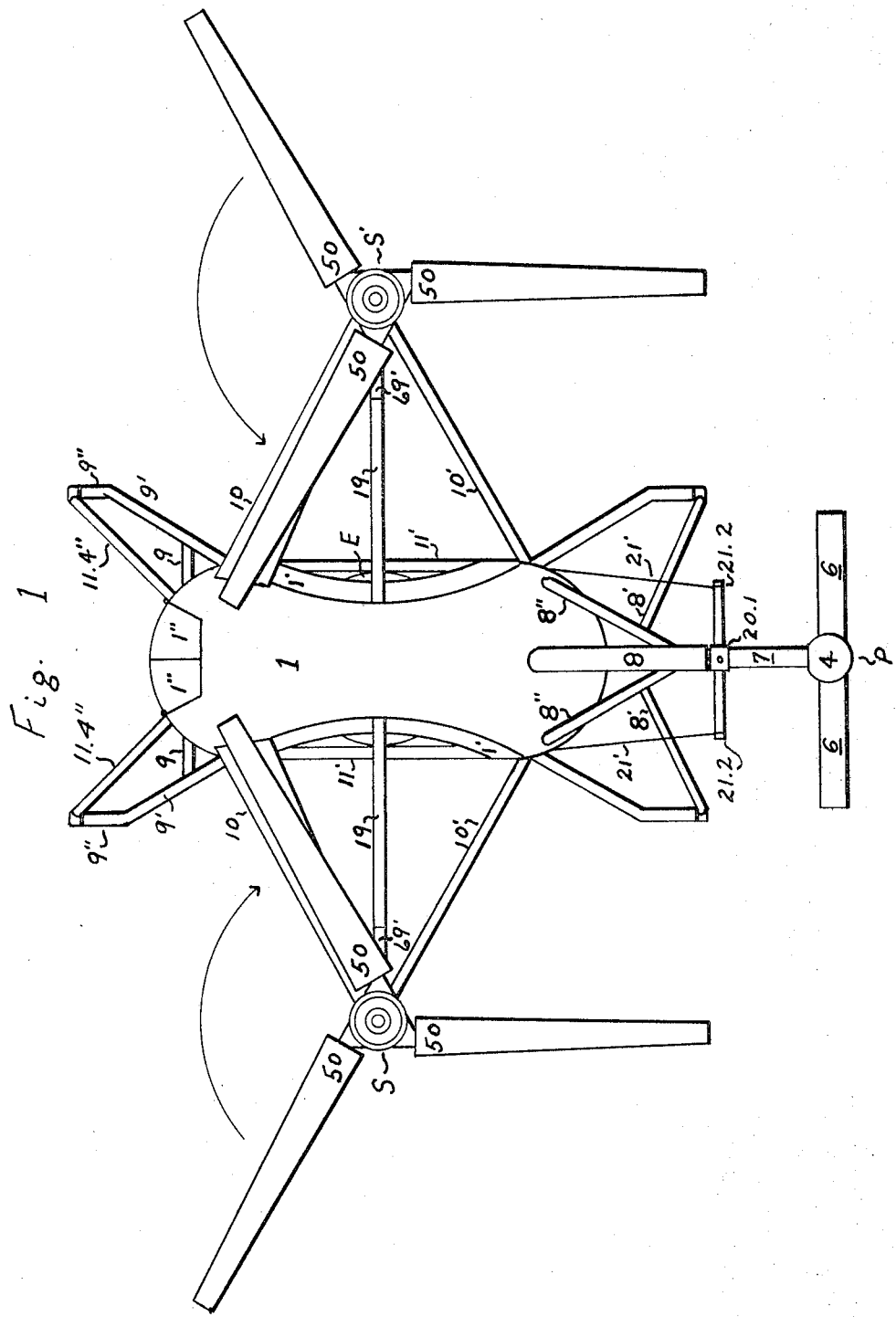

In the drawings, in which like numerals designate like parts, it can be seen that the axes of my three tubular cylindrical blade roots 111 of each of the airfoil rotor blades 50 of conventional design and conformation (well known to the art per se) are disposed at angles of 120 degrees with respect to each other and are mounted pivotally within their respective tubular brackets 112, in turn having at least almost cantilever mountings at the same angles in an outer annular hub member 113, having substantially fixed conformation, which is shown in vertical cross sectional in FIG. 11 as generally resembling a large rope pulley from which all the spokes have been removed to leave only the generally horizontally disposed U-shaped sheave thereof. In FIG. 10 the broken lines in the fragmentary blade 50 are intended to indicate that tubular metal spars 50' within the respective blades 50, in which the blade roots 111 are almost rigidly mounted (FIG. 11), have their respective axes exactly parallel to the longitudinal axes of respective blades 50, in which those spars 50' and their respective almost rigidly mounted blade roots 111 are mounted sufficiently forward in the chords of said blades 50 that the trailing segments of those blades tend to control pitch of the blades by their rotational drag around the mounting shaft 12 of the rotor, unless acted on by other pitch adjusting means to be explained later herein. But it is intended that the hub assembly 110 of the rotor S' having blades 50 shown in FIGS. 10, 11, and 12 may be mounted on the corresponding right hand mounting shaft 12 of the rotor S′ shown in FIGS. 1 and 4 of my copending application Ser. No. 688,318, in which FIG. 1 indicates that the longitudinal axes of the respective blades 50 alternatively may have their respective blade roots 111 mounted with a very slight drag angle with respect to the longitudinal axis of the corresponding blade 50, thereby giving slightly more rigidity to the blades 50 as a result of the drag angle of each blade, although the disposition of the tangentially disposed tubular brackets 112 (not quite rigidly mounted in annular sheave-like rather rigid outer annular hub member 113) need not be changed in their mounting of the tubular cylindrical blade roots 111.

Obviously the three tubular blade-mounting brackets 112 alternatively could be welded rigidly into a slightly larger almost rigid outer annular hub member 113 to give the axes of the blade roots 111 pivotally mounted therein some slight angular variation from a plane perpendicular to the mounting shaft, thereby tending to dispose the longitudinal axes of blades 50 at angles to said plane and making them travel in the same slightly conical path, by which centrifugal force on blades 50 would tend to give some additional strength to said rapidly rotating blades. But such alternative rigid mounting of tubular brackets 112 in almost rigid outer annular hub member 113 would tend to increase vibrational fatigue not only on blades 50 but also on the mounting of brackets 112 in said outer annular hub member 113. The slightly flexible mounting of brackets 112 in hub member 113 shown in FIGS. 10 and 11, therefore, is employed without depriving the rotors S and S′ of the almost cantilever mounting of their blade roots 111 that imparts the gyroscopic stabilizing tendencies of the respective blades 50 (rotating in opposite directions at rather high speed by virtue of their rotationally interconnected mounting shafts 12, whose torques offset each other exactly at the same rate of speed, and whose lateral precessional tendencies of their rotors exactly counteract each other, when the fuselage 1 is tilted longitudinally by the tail rotor) to their respective rapidly contra-rotating mounting shafts 12 to give primary lateral stability to the aircraft in flight. In this connection it will be noted that the mounting of tubular brackets 112 in outer hub member 113 tangentially thereto gives the longitudinal axes of blades 50 enough drag angle to make them stay rather rigidly disposed with respect to the mounting shaft 12 in flight, even though brackets 112 (inclosing cylindrical blade roots 111 at least almost in alignment with the longitudinal axes of blades 50 respectively) are not welded in outer annular hub member 113 rigidly, and even if such welds would hold up permanently in spite of vibrational fatigue resulting from cyclical flexing of blades 50.

Brackets 112 are held in place suitably in the outer sheave-like hub member 113 by tip-threaded upright bolts 114 and 115 (immediately outside and inside respectively of the tubular brackets 112) inserted perpendicularly through corresponding holes in the respective upper and lower annular flanges 126 and 127 of outer hub member 113 having a substantially fixed conformation. While the axes of tubular cylindrical blade-mounting brackets 112 in FIG. 10 (showing three blades 50 mounted in hub 110 to travel in the same orbital paths around shaft 12) form a perfect triangle, the front tip of each of the three tubular brackets 112 is cut off at a 30 degree angle from its longitudinal axis; and to that reformed angular rotationally-leading tip of each of the tubular brackets 112 is welded a vertically disposed partially closing butt member 116, which is spaced only slightly from the parallel inner butt face 117 of the rotationally-preceding pivotally oscillatable blade 50. Each of the butt faces 116 and the rotationally forward tip of the tubular bracket 112 to which it is welded is milled out cylindrically to fit the rear cylindrical wall of the rear tip of the rotationally-preceding tubular bracket 112, to which the rotationally-forward tip of each such following bracket is fixedly but not quite rigidly attached by means of a corresponding normally horizontally disposed U-shaped strap clevis 118, whose rear tips are joined together fixedly by means of a nut screwed on a tip-threaded bolt 119 inserted vertically through corresponding holes in the upper and lower walls of the forward tip of the rotationally-following tubular bracket 112. The three such U-shaped strap clevises 118 looped around the respective rotationally rear tips of the tubular brackets 112 and fixedly attached to the rotationally front tips of the respective rotationally-following brackets 112 by means of nuts on bolts 119 thus form a very slightly flexible almost triangular substantially fixed bracket framework mounted snugly in the sheave of the annular outer hub member 113, which permits just enough movement of the tubular brackets 112 in that hub member 113 between its annular substantially parallel flanges 126 and 127 to relieve vibrational fatigue in blades 50 and their not quite rigidly attached roots 111 as well as in the members of the hub assembly 110 itself. Strap clevises 118 may be modified to some extent to give additional rigidity to the mounting of tubular brackets 112 in that hub 110, as desired; but under any circumstances there will not be sufficient flexibility in the mounting of blade roots 111 in the outer hub member 113 to keep blades 50 from serving as powerful gyros at their comparatively high rotational speed. Note in FIG. 10 that the three vertically disposed bolts 120, inserted through corresponding holes in the strap clevises 118 and substantially in contact with the walls of the front and rear tips respectively of the tubular brackets 112 adjacent thereto, may have their respective nuts screwed down tight enough to give suitably increased stiffness to the connection between the respective rear and front tips of the three tubular brackets 112 mounted in outer tubular member 113 having an almost fixed configuration.

Note in FIG. 10 that slots 121 (indicated by broken lines) in the upper and lower walls of the respectively rotationally-forward tips of tubular blade roots 111 permit necessary pivotal oscillation of those blade roots in their respective tubular brackets 112 with respect to vertical bolts 119 mounted therethrough for pivotal oscillatory adjustment of suitable amount within such limits of the pitch of blades 50 almost rigidly attached to those blade roots 111 respectively. But at the same time the bolts 119 inserted through slots 121 of blade roots 111 prevent the latter from slipping out of their respective mounting tubular brackets 112, although oscillatory pivotal stop members 124, fixedly attached to blade roots 111 (as will be described presently herein), also would prevent such axial slippage of cylindrical tubular blade roots 111 from their respective tubular brackets 112. For the purpose of illustrating a very simple constructions, FIGS. 22, 23, 24 indicate that the rotationally rear segment of each of the cylindrical tubular brackets 112 may be bisected at least almost vertically for several inches, after which the rotationally front wall segment of the bisected rear tip (adjacent the butt of the blade 50 whose cylindrical root 111 is to be installed pivotally in said bracket 112) of said cylindrical tubular bracket is sawed off perpendicular to the axis of said blade rotor in the bracket 112. About half of the arcuate front wall segment removed from the rotationally-rear tip of each of the tubular brackets 112 then is welded as an integral segment 122 into the curved rotationally-front segment of each of the respective horizontally disposed U-shaped strap clevises 118, which, on later attachment of those reformed clevises to the respective bracket members 112, hold the rotationally-rear tips of respective tubular brackets 112 just as previously described with the blade root 111 being pivotally oscillatable therein. There thus has been created a slot 123 in the rotationally-front wall of each of the tubular brackets 112 between the respective clevises 118 and the outer perimeters of the parallel flanges 126 and 127 of outer sheave-like hub member 113.

Within the slots 123 in the respective walls of said brackets 112 there are fixedly attached by suitable means to the respective blade roots 111 suitable oscillatory stop devices 124, illustrated in FIG. 12 as abbreviated arcuate segments of the portions of the front walls removed from the tubular brackets 112 to form said slots 123 therein. But prior to said fixed attachment of arcuate stop devices 124 to blade roots 111, those arcuate stop devices 124 are trimmed to such extent that they leave spaces 125 between the margins of the rear wall of the tubular bracket 112 and the upper and lower margins respectively of the arcuate stop devices 124, so that the respective blade root 111, to which each stop member 124 is fixedly attached, can oscillate pivotally in said bracket 112 through a desired number of degrees for variation of the pitch of respective blade 50 fixedly attached to said blade root 111 having at least almost cantilever mounting in the rather rigid outer annular hub member 113.

Above and below the respective substantially parallel flanges 126 and 127 of outer annular hub member 113 are installed flexible annular plates 128 and 129 made of resilient material conveniently made of multiple plies of cross-woven threads of cotton and nylon, between which are installed suitable quantities of elastic rubber-like substance otherwise employed in manufacture of automobile tires and more particularly of broad flexible belts for power transmission by means of suitable wheels mounted on rotatable shafts. While the cross sections of flexible annular plates 128 and 129 in FIGS. 23 and 24 are illustrated diagrammatically by uniform dots therein as though said material is of uniform resiliency, it will be appreciated that the various plies of such material in each resiliently flexible plate 128, 129 may be of somewhat different material of similar general resiliently flexible nature and that any suitable stiffness of those plates 128 and 129 may be secured conveniently by installing radially therein, between the several plies of cotton and nylon fabric, suitable small spring steel spoke ribs, which are not illustrated in the diagrammatic drawings intended only to illustrate the general nature of the resiliently flexible materials of which those annular plates 128 and 129 are made. Those annular plates 128 and 129 are clamped almost rigidly to the respective upper and lower flanges 126 and 127 of outer annular hub member 113 by nuts and washers on tip-threaded bolts 114 and 115, which extend through corresponding holes in the horizontal annular metal flanges 150 and 152 respectively having stiffening vertically disposed integral band segments 151 and 153 respectively. While the outer edges of metal flanges 150 are illustrated as the perimeters of perfect circles to correspond with the perimeters of similar circular annular members 126 and 127, it will be appreciated that the outer edges of all these members 150, 152, 126, and 127 may be varied somewhat from such perfect circles without affecting too much the working of the hub assembly 110, in which the three blade roots 111 have their substantially cantilever mounting in outer annular hub member 113.

But significantly to the contrary the flexible annular plates 128, 129 have perfectly cylindrical holes at their respective centers rather sungly but rotatably fitting around the cylindrical midsection 130 of the spool fixedly keyed by a suitable key 131 on the annular shouldered upper tip of rotor-mounting shaft 12, on which it is held fixedly by a threaded nut 132 screwed down tightly on the threaded extreme upper tip thereof against a spring lock washer pressing down in turn on a larger flat washer 133 in turn pressed down on the aforesaid spool's readily demountable upper annular flange 134, which also is keyed non-rotatably to rotor shaft 12 by means of the same key 131, the parallel lower annular flange 135 of said spool also being non-rotatable with respect to shaft 12 by virtue of extension downward of key 131 into a keyway thereof as well as by integral attachment of said lower annular flange 135 to the cylindrical midsection 130 of said spool. Resiliently flexible annular plates 128 and 129 are deformed slightly from their original parallel posture by round annular metal plate members 141 and 142 installed respectively below and above said plates 129 and 128 and rotatable around cylindrical midsection 130 of the spool between its upper and lower circular annular flanges 134 and 135. The outer diameters of round annular plate members 141 and 142 are suitably less than the smallest internal diameter of annular outer hub member 113 at its most restricted midsectional plane, so that the resiliently flexible annular plates 128 and 129 may be drawn together more closely between the spool flanges 134 and 135 than are the exterior margins of those plates 128 and 129 respectively above and below the parallel annular flanges 126 and 127 of outer annular hub member 113. But the round annular metal plates 141 and 142 do not bind against the somewhat parallel annular flanges 134 and 135 of the spool, because those round annular plates 141 and 142 respectively below and above the inner margins of resiliently flexible annular plates 128 and 129 have multiple nuts 138 screwed down just sufficiently on multiple corresponding bolts 139, disposed parallel to shaft 12 (around which they are equally spaced, as shown in FIG. 10) and inserted through corresponding holes (FIG. 11) in round annular metal plate members 141, 142 and the intermediate inner margins of resiliently flexible annular plates 128, 129, to make the inner marginal assembly of the annular plates 128, 129, 141, 142 easily rotatable around cylindrical spool member 130 between its respective upper and lower annular flanges 134, 135. Note in FIG. 11 that an undesignated space between the inner margins of flexible members 128, 129 may be left vacant or alternatively may be filled with annular plates of suitable sponge rubber material. To facilitate rotation of plates 141 and 142 around cylindrical spool section 130 between its suitable annular flanges 134, 135 (for which any suitable means of lubrication in the spool 130, 134, 135 may be provided as now known to the art), it is indicated that the round annular plates 141 and 142 respectively are made in two sections, of which those respective sections adjacent flanges 134, 135 of the spool conveniently may be made of bronze, which is somewhat softer than the metal of which the other intermediate sections of those plates 141, 142 (as well as the round annular flanges 134, 135 of the spool 130) may conveniently be made, thereby forming bronze bearings to sustain axial thrust of plates 141, 142 in the spool in which they are mounted rotatably. It will be appreciated that in lieu of such a bronze axial bearing, however, the upper section of round annular plate 142 alternatively may be replaced by a more expensive anti-friction axial ball bearing assembly well known to the art. But such rotation of plates 141, 142 with respect to the spool members 130, 134, 135 is only oscillatory through a few degrees.

FIG. 10 indicates that three nuts 138 respectively are screwed down on three tip-threaded bolts 139 (corresponding to the three tubular brackets 112 in which cylindrical roots 111 of three blades 50 respectively are mounted) against round washers 140 (equally spaced from the axis of shaft 12 and from each other) pressing down against upper annular plate 142, which is observable in that figure mostly through the three arcuate slots 137 (equally spaced from the axis of mounting shaft 12 and from each other) in the outer margin of upper annular flange member 134 of the spool fixedly keyed on shaft 12. Round washers 140 (drawn tightly against annular plate 142 by bolts 139 and nuts 138 as indicated above) have sufficient height to make them serve as oscillatory rotational stops, within the limits of slots 137 in annular plate 134 (fixedly keyed on shaft 12), of resiliently flexible annular plates 128, 129 (and their intermediate almost rigid outer annular hub member 113, attached fixedly to the outer margins thereof by bolts 14, 15 through annular flanges 126, 127 thereof) with respect to shaft 12, on which spool members 130, 134, 135 are keyed fixedly. It will be appreciated, however, that each of the three marginal slots 137 (corresponding to the number of blades 50) in detachable annular flange 134 of said spool alternatively may be widened by several degrees to permit installation of twice the number of bolts 139, which thus alternatively may be inserted through corresponding holes in three stop members 140, which alternatively may be made somewhat arcuate (with an outer diameter equalling that of round annular plate 142) rather than round as indicated in FIG. 10, the only requirement being that the stops 140 permit just enough oscillatory rotation of hub member 113 around the axis of shaft 12, on which the rotor is mounted, for rotation by said shaft 12 rotatable by the engine in normal flight. FIG. 11 indicates that the three bolts 139 have flat heads, which are countersunk in the lower annular metal plate 141 to permit free oscillatory rotation of that metal plate 141 on the annular metal flange 135 integrally attached to cylindrical spool member 130, but it will be appreciated that alternatively (and more expensively) the thickness of annular plate 141 may be increased somewhat to permit installation therein of arcuate marginal slots 137 (exactly corresponding to those of the upper plate flange 134) in which suitable stops 140 can oscillate rotationally just as do those shown in FIG. 10.

FIGS. 10 and 11 show a truncated almost, flat but very slightly conical annular outward extending platform framework segment 136 is integrally attached to the circular outer edge of lower annular flange 135 of the above described spool fixedly attached to the upper tip of shaft 12. That slightly conical platform frame segment 136 extends outward beneath the outer annular hub member 113 (installed almost fixedly intermediate the resiliently flexible annular plates 128, 129 adjacent their outer edges by means of bolts 14, 15 and their corresponding nuts and washers of suitable nature). When the craft lands, the lower such resiliently flexible annular plate 129 (on which is mounted outer annular hub member 113, its brackets 112, and blade roots 111) gradually settles downward on the very slightly conical platform 136, thereby simultaneously giving a broader and thus more stable sustaining base to the outer hub assembly providing almost cantilever mounting of blades 50 for parking the aircraft and at the moment tending to limit gradually the forward rotation of bolts 139 and the stops 140 mounted thereon toward the forward respective walls of marginal notches 137 in spool flange 134.

But that same slightly conical platform 136 also serves as a suitable framework mounting the rotationally rear tips of three coiled compression springs 143 (spaced equally from each other and from the axis of the mounting shaft 12, as indicated in FIG. 10 by broken lines; and equally slightly tilted with respect to the upper face plane of spool flange 135 rigidly mounted thereon, as indicated in FIG. 12) on three cylindrical fingers 144 (equally spaced from each other and from the axis of mounting shaft 12 with the front halves of said fingers in alignment with the longitudinal axes of the respective coiled compression springs 143) illustrated in FIGS. 23, 24 as conveniently simply being welded beneath the outer margin of that conical platform 136 (below the outer annular hub member 113) adjacent the respective rotationally rear walls of three corresponding gaps 145 in said outer margin of conical platform 136, the forward slightly upturned halves of said slightly deformed cylindrical fingers 144 extending forward into their respective said gaps 145, in which are mounted the respective resiliently flexible coiled compression springs 143 of suitable stiffness, whose rear tips are installed around the respective said mounting fingers 144 with their rear ends pressing against the respective rear walls of the gaps 145 in slightly conical platform frame member 136 of the rotor-mounting spool 130, 134, 135 rigidly attached to shaft 12. As illustrated in FIG. 12, the rotationally-forward tips of coiled compression springs 143 of suitable length are mounted around respective similar cylindrical mounting fingers 146 extending rearward rotationally and downward (at a suitable angle to accommodate the respective springs 143) from the rotationally rear faces (perpendicular to said respective fingers 146 approximately at least) of lugs 147 rigidly attached adjacent their lower tips to said fingers 146 and otherwise fixedly attached to the respective lower faces of arcuate oscillatory stop members 124 fixedly attached to respective blade roots 111 in slots 123 of brackets 112, as explained previously. The rear faces of blade-pitch-adjusting pressure lugs 147 (below the respective axes of cylindrical blade roots 111) are in respective planes substantially parallel to said blade root axes; and those rotationally rear faces of lugs 147 form annular shoulders (around cylindrical spring-mounting fingers 146 mounted therein and perpendicular thereto), against which press with increasing force the forward ends of respective coiled compression springs 143, when shafts 12 and their rigidly attached spool members 130, 134, 135, 136 (mounting the rear tips of respective springs 143 in gaps 145 on fingers 144) are rotated (only slightly through a few degrees of rotational oscillation around shaft 12 within limits previously described in connection with marginal notches 137 in spool flange 134) with respect to the outer annular hub member 113, in which blade roots 111 respectively have their pivotal almost cantilever mounting in its almost fixedly mounted tubular brackets 112.

Such increases pressure of resilient coiled compression springs 143 on the respective rotationally-rear annular faces of lugs 147 as the result of increased torque of the engine on rotor mounting shafts 12 obviously has two interrelated simultaneous results. First of all, while pressure of the stop members 140 against the radially disposed rotationally-rear walls of arcuate notches 137 in the outer margin of spool flange 134 would rotate outer annular hub member 113 (in which cylindrical roots 111 of blades 50 have their (at least almost cantilever mounting) in the initial process of starting the considerable mass of rotors S and S' to rotating at suitable speed and perhaps later in flight during any sudden increase of torque of the engine on rotationally interconnected shafts 12, in ordinary engine-powered flight it is the somewhat variable pressure in unison of the multiple resilient coiled compression springs 143 against the respective rear faces of pressure lugs 147 that directly causes the several roots 111 of blades 50 to rotate around the axes of their respective mounting shafts 12, from which those lugs 147 are equally spaced at suitable distances. But, secondly, at the same time the torque of the engine on rotationally interconnected shafts 12 (fixedly mounting the respective slightly conical platform frames 136 integrally attached to the spools mounting the outer annular hub members 113) transfers its torque as tangential pressure on the rear ends of the respective resilient coiled compression springs 143, whose front ends thereby simultaneously press against the rotationally rear faces of the respective off-center mounted pressure lugs 147 to make those lugs 147 exert a torque around the axes of their respective blade roots 111 (disposed at least almost in a plane perpendicular to the axis of the mounting shaft 12) tending to increase the angles of attack of the respective blades 50 by the torque on their cylindrical roots 111 pivotally mounted in respective tubular brackets 112 in the outer annular hub member 113, although that torque around the respective blade root 111 obviously might be applied directly to the blade 50 itself alternatively by attachment thereto of a suitable bracket, in lieu of the spring-mounting lug 147 shown as fixedly attached to the blade root 111.

Conversely, when the torque of the engine drive-shaft on rotationally interconnected shafts 12 is reduced very substantially (and not necessarily only when there is a substantially complete cessation of torque of the engine on shafts 12 due to failure of the engine's power, elective by the pilot or otherwise) to such extent that the craft begins to descend, pressure lugs 147 will press backward against the coiled compression springs 143 to reduce the pitch of blades 50 as a result of the decreased torque of the engine of shafts 12 (and thereby on blade roots 111 around their axes in the respective tubular brackets 112) so that the rotational speed of those blades 50 around the axis of the mounting shaft 12 will not be reduced critically (or even too substantially) and the airfoils of those blades 50 rotating at suitably constant speed will not "stall" to cause the craft to plummet to the ground wih even disastrous results, as sometimes has been the case with helicopters previously, particularly when the power diminution took place at relatively low altitude permitting no time for response by the pilot for manual adjustment of pitch of blades of the usually sustaining rotor, and more particularly at the time when his first attention was on the fact that variation in the torque of the engine on the shaft of that rotor necessitated his adjustment of the blade pitch of his counter-torque tail rotor to keep the fuselage from whirling around horizontally. Such previous failures of helicopters in some cases have been disastrous for the passengers even with most experienced pilots.

Note in FIGS. 10 and 12 that resiliently flexible coiled compression springs 143 are disposed in perfect alignment with their respective cylindrical mounting fingers 144 and 146 (fixedly attached respectively to the rear walls of marginal gaps 145 in slightly conical almost horizontal platform frame member 136 and to the corresponding rotationally-rear faces of their respective pressure lugs 147 fixedly attached to stop members 124 and thereby to their blade roots 111), for it is presumed in those figures that the springs 143 are only moderately compressed in accordance with positions of the three bolts 139 disposed at the midpoints of arcuate marginal notches 137 shown in FIG. 10 and with the three blade roots 111 so disposed rotationally in their respective tubular brackets 112 that the blades 50 almost rigidly attached to those roots 111 would have only moderate positive angles of attack of about five degrees from the plane including the axes of the three blade roots 111 in their respective brackets 112. For ease of illustration, FIG. 12 shows only one of the three tubular brackets 112 and its telescoped tubular blade root 111, both of which in that position are shown easily as perpendicularly disposed to the plane of the cross section adjacent the coiled compression spring 143, which is mounted to slide easily on the cylindrical mounting fingers 144 and 146 made long enough to keep the tips of respective spring 143 suspended thereon with its ends against the rear wall of gap 145 and the lug 147 respectively, when the spring is fully extended by virtue of the fact that the outer hub 113 on occasion may rotate forward with respect to mounting shaft 12, until stop members 140 (FIG. 10) are against the rotationally forward walls of arcuate marginal notches 137 in spool flange 134. On the other hand, it is contemplated that springs 143 will be just about fully compressed at the time those stops 140 would reach the rotationally-rear walls of notches 137; but it will be appreciated that such springs 143, all of which are of exactly the same length, may be shortened very slightly or that contrariwise their compressive resiliency may be increased slightly by inserting small spacing washers around the respective fingers 144 and 146 adjacent the ends of those springs 143.

FIG. 12 indicates that, if torque of the engine on spool cylinder 130 were increased appreciably, the blade root 111 would rotate counter clockwise in its slotted tubular bracket 112, until the space 125 at the top of blade root 111 adjacent the stop member 124 attached fixedly thereto would be closed, at which time the angle of attack of blade 50 would be at its maximum for effective lift by means of the rotation of the six blades 50 (as indicated in FIG. 1) at suitable tip speeds by the engine of suitable horsepower having some slight reserve of power, which need be only minimum in view of the fact that blades 50 will have their pitch adjusted automatically instantaneously as need may arise. And conversely, if the power of the engine and its torque on rotationally interconnected shafts 12 turning in opposite directions were reduced substantially either by partial or complete failure of the engine or by the pilot's reducing the speed of the engine by use of his throttle thereon, the trailing edges of blades 50 would tend to move upward with respect to the descending blade roots 111 to reduce the angles of attack of those blades 50 by the required amount to keep those blades rotating at effective lift speeds, either for operation under fractional engine power or under complete aerodynamic autorotation of those blades 50 by virtue of the operation of the over-running clutch between the engine's drive-shaft and drive-shaft rotationally interconnected with rotor-mounting shafts 12. In the better instance the space 125 at the lower side of blade root 111 adjacent stop member 124 would be closed, and the trailing edges of blades 50 would be raised to positions even slightly higher than that indicated by the one blade 50 shown in FIG. 11, in which the trailing edge of that blade 50 adjacent its root end is in the plane including the axes of roots 111 in brackets 112. But, since the areas of those segments of blades 50 rotationally rearward of their longitudinal axes are greater than those segments forward of said axes, the blades 50 would tend to twist slightly, thereby causing continued rotation of those blades even in the position shown in FIG. 11.

It is notable that the proper functioning of resilient coiled compression springs 143 is not appreciably affected adversely either by rotation of tubular brackets 112 mounting blade roots 111 with respect to their rotor-mounting shafts 12 or by other movements of outer annular hub members 113 mounting those tubular brackets 112 with respect to the axes of those shafts 12 respectively, both universally and axially. FIG. 12 indicates that a small notch 148 is cut in the peripheral margin of the lower resiliently flexible annular plate 129 and that a corresponding notch 139 may be milled in the peripheral margin of the lower flange 127 of the stiff outer annular hub member 113 immediately above each of the coiled compression springs 143 to avoid any possible conflict of said outer hub members 127 and 129 with such springs 143, although it will be realized from FIG. 24 that merely attaching lugs 147 to stop members 124 a little closer to the base of airfoil blade 50 would remove any possible contact of springs 143 with lower flange 127 of outer annular hub member 113. But, immediately before landing of the craft, springs 143 will expand, as bolts 139 rotate forwardly with respect to slightly conical platform framework 136 mounting fingers 144 at the rear walls of notches 145 therein by virtue of the rotational momentum of blades 50; and at that time the three springs 143 merely serve to give stability to the outer annular hub member 113, as its lower attached resilient plate member 129 settles downward onto almost horizontal but conical plate 136, whose diameter may be increased as desired from that shown in the drawings. Obviously notches 148 and 149 in members 129 and 127 may be modified respectively to accommodate coiled compression springs 143; but it will be noted that those resilient coiled compression springs 143 will operate substantially the same regardless of movement in any direction of cylindrical fingers 146 (fixedly attached to blade roots 111) with respect to their corresponding fingers 144 (fixedly mounted in gaps 145 of conical member 136, fixed with respect to shaft 12), whether any such movement of fingers 146 with respect to their correspondingly paired fingers 144 mounting the respective ends of springs 143 be the result of rotation of shaft 12 with respect to outer annular rigid hub member 113 or be the result of movement of hub member 113 axially or universally with respect to the mounting shaft 12 by virtue of the resiliency of flexible annular hub members 128 and 129 permitting all such movements but gradually limiting the extent of all such movements.

Since resilient coiled springs 143 are of the compression rather than tensional variety, it may be observed that even a rupture of one of those coiled compression springs 143 (as conceivably but not probably might be possible as a result of continual flexing over a period of many years) would not be disastrous, because the broken spring still would stay mounted on its fingers 144, 146, if the break were intermediate the tips of the spring as would be expected, while the other two springs 143 at the moment would be compressed completely under their increased rotational loads around the mounting shaft 12. There then might be slight vibration of the rotor as a result of the modified angle of attack of the blade having the broken spring 143, in which event the pilot simply could cut off the power of his engine and permit the craft to descend slowly to earth under aerodynamic autorotation of blades 50 of both the paired side-by-side mounted rotors S and S', whose stops 140 on bolts 139 would drift forward automatically and almost immediately against the rotationally forward walls of notches 137 in flange 134. Thus, even with a broken spring 143 on one of the rotors S and S', my craft would come down safely to earth; and in the interval of rather slowly descending those same rotors S and S' under aerodynamic autorotation (instantaneously and automatically actuated on diminution of torque of the engine on mounting shafts 12 of those rotors) would continue to drive mounting shaft 2 of the auxiliary steering and fuselage-tilt control tail rotor P, whose blades normally are disposed in an at least almost horizontal plane (whether shaft 2 is turned by the engine or autorotationally by blades 50 of the side-by-side main sustaining rotors S and S', whose mounting shafts 12 at all times are rotationally interconnected with shaft 2 of the auxiliary rotor as explained in detail in my application No. 562,939 filed simultaneously herewith as well as in my previous pending application No. 688,318 filed Oct. 4, 1957 and restricted Aug. 1, 1958). The fact that one of the springs 143 was broken (and even if its broken parts dropped off fingers 144 and 146 to fall to the ground) would in no way keep the pilot from steering his craft anywhere he wished in descending; and he even could make the craft back up a little on landing to utilize the last momentum of the rotors in effecting a relatively soft landing, not to mention that he always can employ that tail rotor to tilt the fuselage longitudinally and thereby tilt sustaining rotors S and S' to make them act as brakes on forward movement of the craft to avoid a collision in the air with another craft.

As explained previously, however, during normal flight sustained by the engine's rotation of shafts 12 in unison in opposite directions, the three rotational stops 140 mounted almost rigidly on bolts 139 of each of the sustaining rotors S and S' do not come in contact with their respective front and rear walls of the arcuate notches 137 in the outer margins of spool flanges 134, which serve to stop rotation of the outer hub members 113 relative to the spools and their mounting shafts 12 only in landing of the craft or in sudden rotational acceleration of blades 50 of the pair rotors S and S'. In such normal engine-powered flight the blades 50 are rotated by forward pressure of coiled compression springs 143 in unison directly against the respective axes of blade roots 111 in their tubular brackets 112, while simultaneously the forward pressure of each of those coiled compression springs 143 tends to increase individually the angle of attack of its respective blade 50, to the cylindrical root 111 of which is attached fixedly its lug 147 mounting rigidly thereto the cylindrical spring-mounting finger 146, whose longitudinal axis is slightly below the respective pivotal axis of its mounting blade root 111 in its tubular hub bracket 112 having almost (but not quite) cantilever mounting in outer annular hub member 113. The suitable off-center distance of the longitudinal axes of fingers 146 below the pivotal axes of their respective mounting blade roots 111 in their respective brackets 112 will depend on not only the cross sectional configuration of the airfoil of blades 50 (well known to the art and not claimed by me as my invention per se) but also on whether the longitudinal axis of each of those blades 50 may be constructed alternatively in substantially perfect alignment with the axis of the respective cylindrical blade root 111 in its bracket 112, or parallel thereto, or at a very slight angle to said mounting axis of the blade root in its bracket 112.

FIG. 10 indicates by means of the broken lines indicating a tubular mounting spar in one of the blades 50 at the left of that figure that the longitudinal axes of blades 50 (very much longer than broad) alternatively may be made parallel to the respective axes of cylindrical blade roots 111 in tubular brackets 112. But FIG. 12 shows the longitudinal axis of cylindrical spring-mounting finger 146 a considerable slight distance below the axis of blade root 111 in its bracket 112, as would be indicated suitable for blades 50 having their respective longitudinal axes disposed at a very slight angle with respect to their substantially fixedly attached cylindrical blade roots 111 as shown in my small scale FIG. 1, representing long blades 50 of suitable lengths whose outer tips have their respective longitudinal axes some several inches rotationally rearwardly of outward projections of the axes of cylindrical blade roots 111 in their respective brackets 112. The rotational drag of blades 50 such as those indicated in FIG. 1 in conjunction with the lift thereof adjacent their faster moving outer tips would tend to exert considerable torque clockwise on cylindrical blade roots 111 indicated by the one at the right-hand side of FIGS. 11, 12; and that torque of the blade 50 on its root 111 in bracket 112 would have to be countered by the torque of spring 143 pressing (as a result of torque of the engine drive-shaft on mounting shafts 12) against the annular shoulder of pressure lug 147 mounting cylindrical finger 146 inserted slidably in the forward tip of resilient coiled compression spring 143 slightly off-center suitably below the axis of root 111 in its bracket 112 in order to give some slight leverage to the force of resilient spring 143, which incidentally has only a fraction as much leverage as would the outer tips of blades 50 shown in FIG. 1 with respect to the axes of their respective blade roots 111 in their brackets 112, although the drag angle of those blades 50 in that small scale figure is quite adequate to make those blades quite stable in their mountings in their respective hubs 110 of rotors S and S'.

Figure 13:
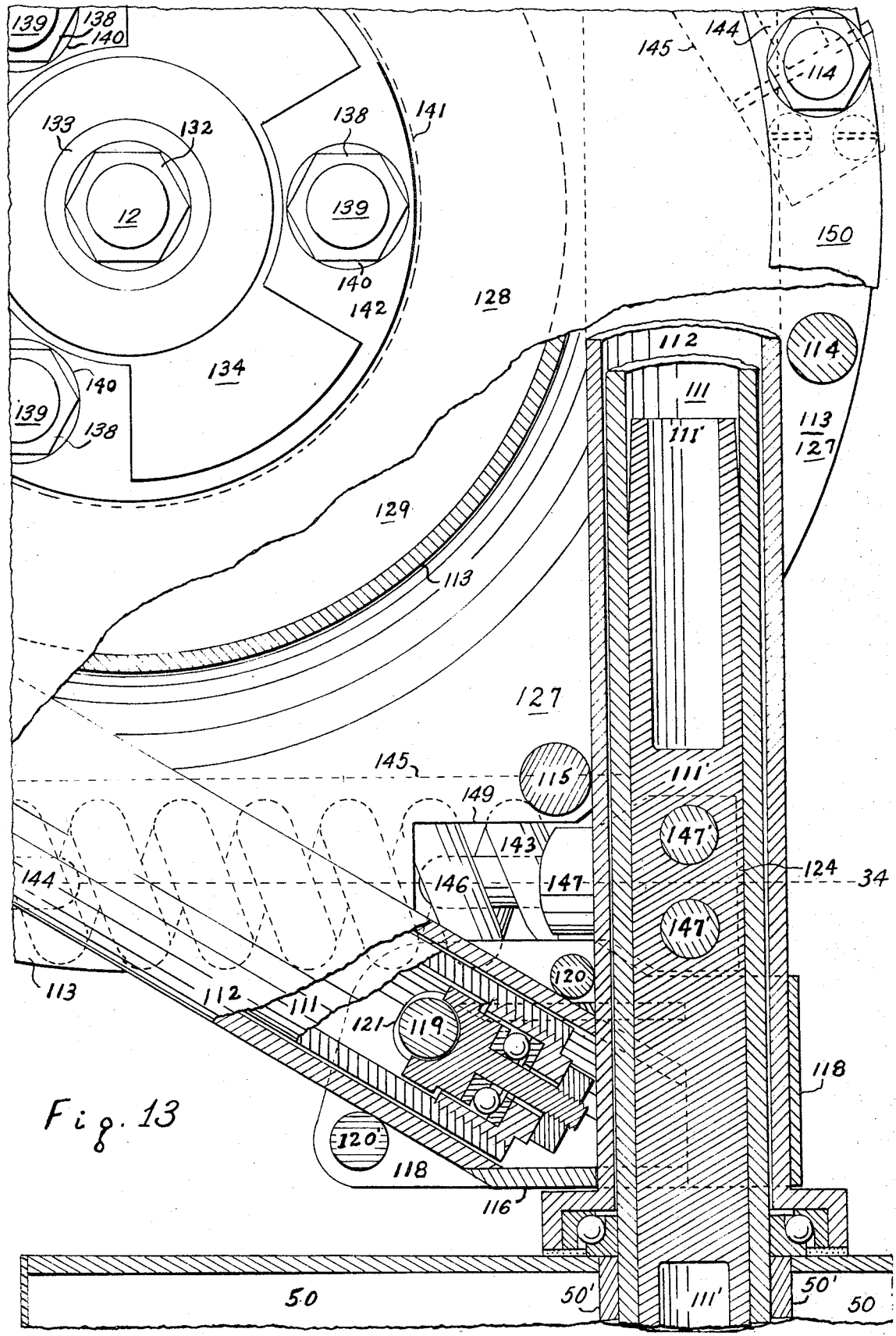
FIG. 13 is a fragmentary plan view from above a segment of an optional alternative hub in lieu of that shown in FIG. 10 and shown cut-away segments down to the respective axes of the blade root mounting tubular brackets, in turn mounted in the outer annular member of that hub having substantially fixed conformation, and the blade roots mounted therein.

FIG. 13 is a fragmentary plan view from above at twice the scale of FIGS. 10, 11, 12 of an alternative hub 110 employing the same principles as those illustrated in the three latter figures, which show cylindrical blade roots 111 pivotally oscillatable within desired limits in the sleeve bearings of their respective mounting brackets 112, which would make the rotors S and S' rather "stiff," although the drag angles of blades 50 in FIG. 1 (with respect to the pivotal axes of their roots 111 in their respective brackets 112) would enable the tips of those blades to oscillate their respective roots 111 in the brackets 112 with ease and give stability to those blades 50 of considerable length in cross currents of air at high forward translational speeds. Such sleeve bearings are quite adequate for blades 50 having their longitudinal axes mounted at slight angles with respect to their blade roots 111 in brackets 112 as indicated in small scale FIG. 1. But optional alternative FIG. 13 at larger scale illustrates that, when the longitudinal axes of blades 50 alternatively are either parallel to or in alignment with the respective axes of their blade roots 111 (except for the normal bending rearward of blades 50 toward their outer tips as a result of drag resistance of the air), blade roots 111 alternatively may in that event be pivotally mounted in suitable antifriction bearing assemblies, one of which is shown as a ball bearing assembly mounted in the expanded outer rotationally-rear tip of tubular bracket 112 (shown cut away to the axis thereof fragmentarily in FIG. 13), and the other one of which is shown as a primarily axial thrust ball bearing assembly mounted inside the forward tip of blade root 111 and resting against a vertically disposed bolt 119 installed through slots 121 in that blade root 111 as described previously in connection with FIGS. 10, 11, 12 as a means of keeping the blade roots 111 from being pulled out of their respective tubular brackets 112 (mounting bolts 119 in vertical holes therein in FIGS. 10, 11, 12) by centrifugal force on the attached blades 50. FIG. 13 also shows one of three additional normally vertical bolts 120' installed through holes in the rotationally rear very slightly modified tip of the strap clevis 118 adjacent the outer wall of the front tip of the rotationally rear tubular bracket 112 as a means of increasing the strength and rigidity of the outer almost triangular framework formed by the three brackets 112 in conjunction with those three such strap clevises 118 with the three brackets 112 being not quite rigidly mounted in almost outer annular hub member 113 having a substantially fixed configuration. Also note in this same connection that in FIG. 13 each of the brackets 112 will have two vertically disposed bolts 114 mounted adjacent each of the brackets 112 on the outer side thereof (mounted through corresponding holes in the parallel flanges 126, 127 of hub member 113 and resiliently flexible annular plates 128, 129 as well as upper and lower flanges 150 and 152), while the bolt 115 adjacent the inside wall of each of the three such tubular brackets 112 is mounted as far rearward as possible when flanges 126, 127, etc. each have a simple circular outer margin as illustrated. In FIG. 13 a small slot 149 has been shown in the peripheral margin of lower circular flange 127 of outer hub member 113 adjacent the normally vertically disposed bolt 115; and below this slotted notch 149 can be seen the front tip of one of the three coiled compression springs 143 mounted slidably on cylindrical finger 146 correspondingly fixedly attached to a very slightly modified pressure lug 147 fixedly attached (as indicated in FIGS. 14 and 15) in turn to cylindrical blade root 111 through a corresponding slotted orifice 123 in the lower wall of bracket 112 by means of two bolts 147' screwed into thread tapped holes in a short reinforcing cylindrical member 111' snugly installed inside the blade root 111 across the slight gap between the vertical inner butt face of oscillatable blade 50 and its expanded rotationally-rear tip of its pivotally mounting tubular bracket 112, in which the anti-friction ball bearing assembly is installed on blade root 111 as shown in FIG. 13.

Figure 14:
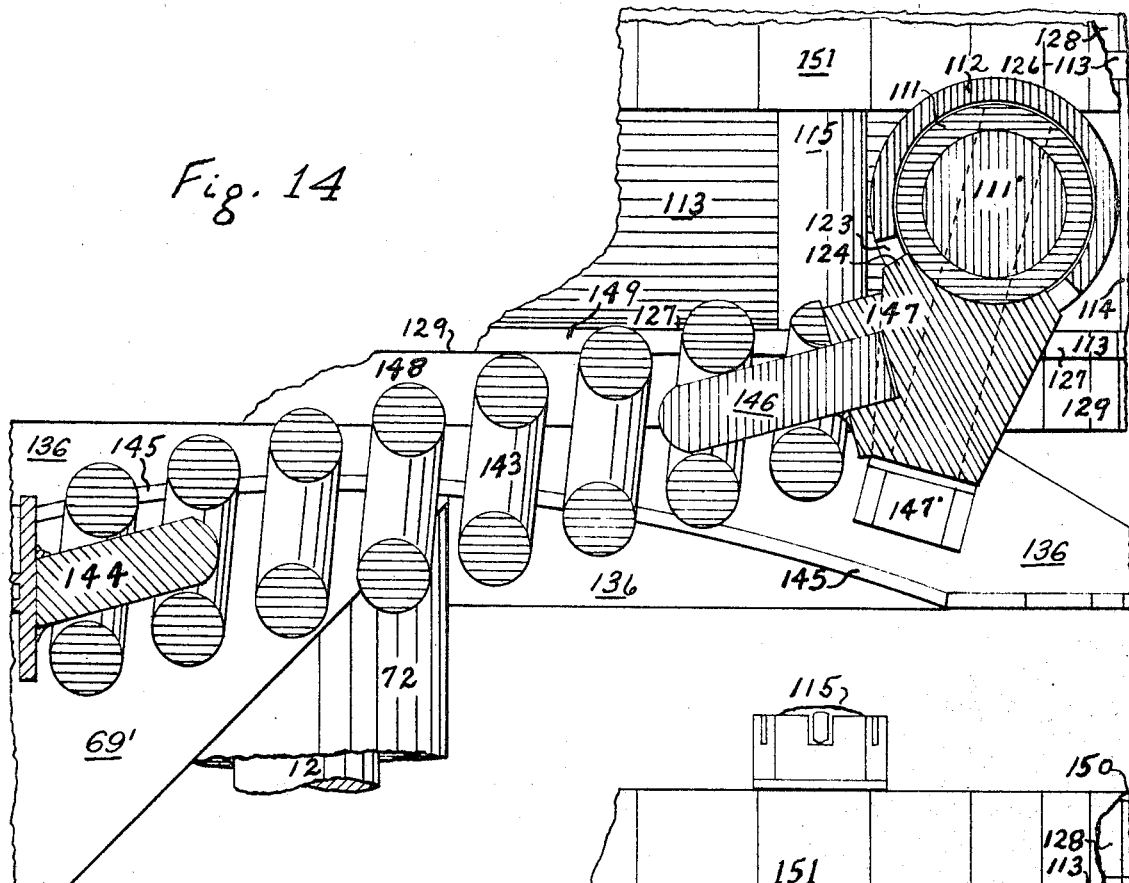
FIG. 14 is a vertical cross section through the hub members shown in FIG. 13 along line 144–34 thereof.
Figure 15:
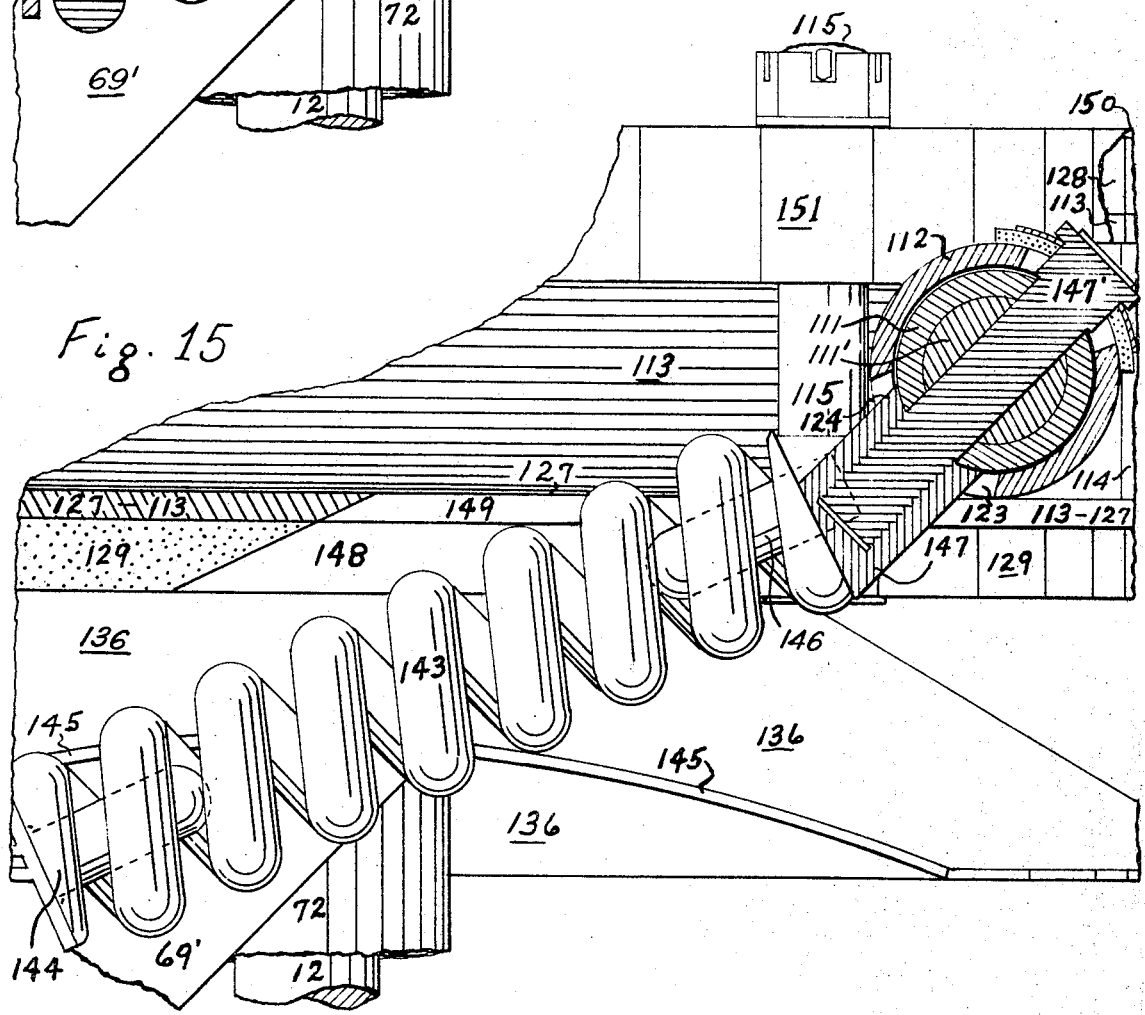
FIG. 15 is a vertical cross section in a plane parallel to that of FIG. 14 through an alternative means of attaching a slightly different spring-mounting lug to one of the blade roots shown in FIG. 13 at the axis of one of the two attaching bolts 147'.

In FIG. 14 is shown a vertical cross section through the longitudinal axes of cylindrical fingers 144, 146 and the resilient coiled compression spring 143 mounted thereon, through a very slightly modified pressure lug 147 against which the front tip of that spring 143 normally presses in flight with the longitudinal axis of the cylindrical finger 146 mounted therein slightly closer to the axis of cylindrical blade root 111 in bracket 112 (as would be required with blades 50 having their respective longitudinal axes parallel to the extended lines of the axes of blade roots 111 in their brackets 112, as indicated in FIG. 23 rather than at a slight angle thereto as indicated in FIG. 1, as explained previously), with the said pressure lug 147 being united as an integral part of a corresponding pivotal stop member 124 milled out to form an arcuate cylindrical cavity therein to fit the cylindrical lower wall of the cylindrical blade root 111, to which it is bolted fixedly by means of threaded stud bolts 147', one of which is indicated by broken lines as extending through the upper and lower walls of tubular cylindrical blade root 111 and its telescoped reinforcing member 111', which is a convenient means in which also to rigidly mount the bolts 147' fixedly attaching the correspondingly conforming combination pressure lug and pivotally oscillatory stop members 147, 124 to said blade root through accommodating slot 123 in tubular bracket 112.

When blades 50 are constructed to have their longitudinal axes in substantial alignment with the axes of their respective cylindrical roots 111 in brackets 112 (except for the slight rearward bending of the blades 50 as a result of air drag), little offset leverage (from the respective axes of roots 111 in brackets 112) for springs 143 on their respective pressure lugs 147 is required to bring about suitable positive angles of attack of said blades 50 in opposition to their natural drag tendency to have the trailing edge substantially in the orbital path containing the axes of blade roots 111 in brackets 112, in which event the axis of one of the said fingers 146 mounting the front tip of its coiled compression spring 143 is spaced only a very little below the axis of the respective cylindrical blade root 111 in its tubular cylindrical bracket 112. A suitable alternative mounting for such a construction circumstance with the longitudinal axes of blades 50 in perfect alignment with the axes of their respective roots 111 is indicated in FIG. 15, which shows a vertical cross section through the longitudinal axis of one of two bolts 147' (corresponding to the two bolts 147' shown in FIGS. 13 and 14) in a plane adjacent the side of the mounted coiled compression spring 143; but in this instance it will be noted that the tip-threaded stud bolts 147', having small annular shoulders that are drawn down against the upper wall of the blade root 111 through which they are installed in two holes (almost but not quite in alignment with the longitudinal axis of finger 146 attached fixedly to pressure lug 147), are inserted through a second slot in the upper wall of tubular bracket 112 (diametrically opposed to the lower slots 123 therein), which slot has to be closed by the arcuate semi-cylindrical flexible washer to prevent any entrance of water that on occasion otherwise could freeze in that second slot generally corresponding to the slot 123 at the bottom of tubular bracket 112 by which pivotal oscillation of stop member 124 is limited, just as in the case of FIGS. 10, 11, 12.

Figure 4:
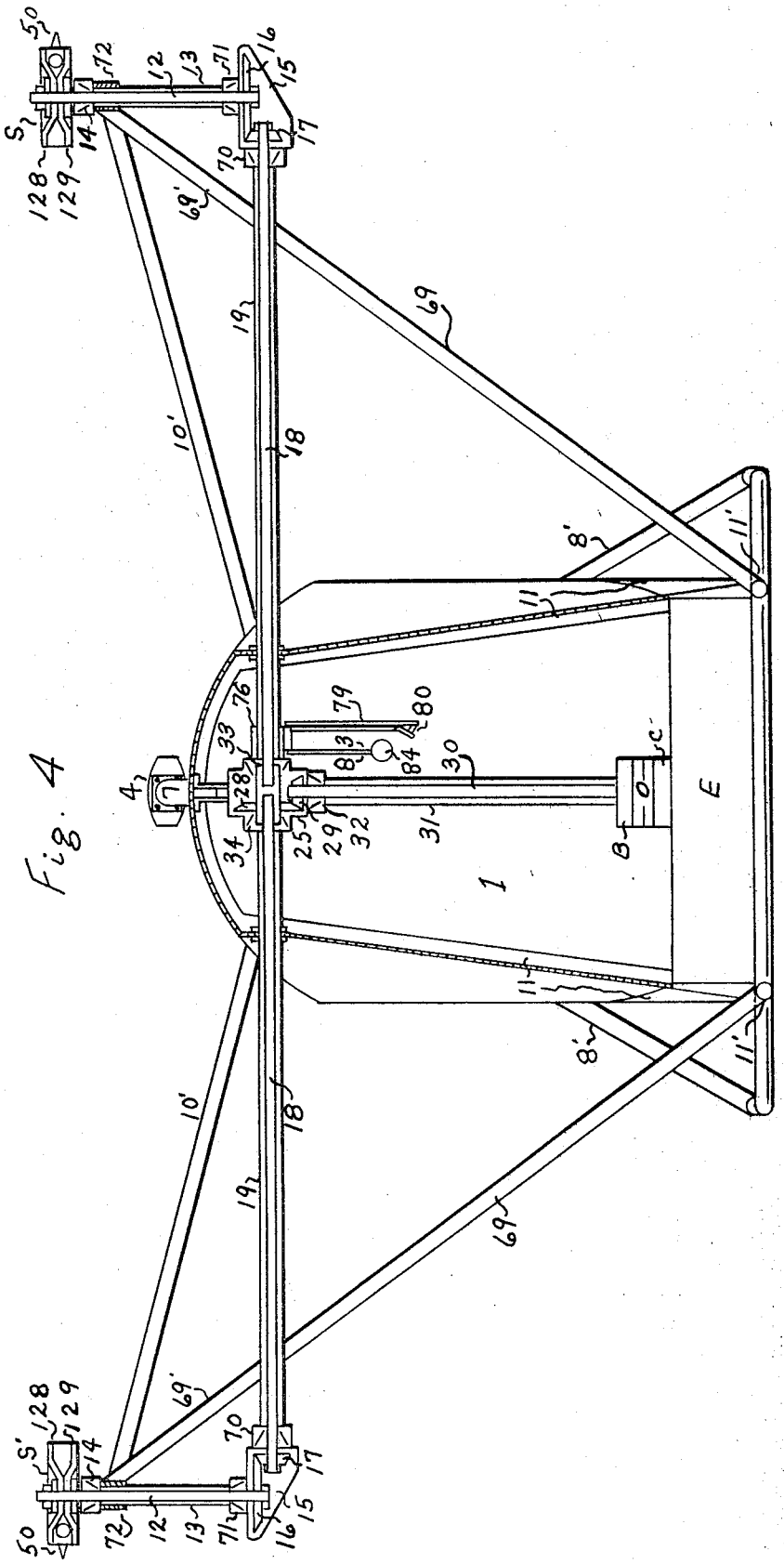
FIG. 4 is a cross section at right angles to the longitudinal axis of fuselage 1 shown in FIGS. 1 and 3.

It is to be noted that, while the engine E indicated in FIG. 4 of my copending application Ser. No. 688,318 may be exerting exactly equal torque on rotationally interconnected rotor mounting shafts 12 of the side-by-side mounted rotors S and S', the multiple coiled compression springs 143 of each of those two rotors do not as a result of necessarily at all times exert exactly the same torques on blade roots 111 mounted in tubular brackets of all of the blades 50 of the rotors S and S' mounted thereon. For, because there is resiliency in each of the coiled compression springs 143 in flight, the lugs 147 respectively mounting fingers 146 fixedly attached to blade roots 111 will tend during rapid forward translational flight to press back more (as a result of increased air drag on the trailing segments of blades 50 rearward of the axis of corresponding roots 111 in their brackets 112) on the flexible springs 143 during the forward orbital phases of travel of those blades 50 around their upright axes, thereby decreasing the angles of attack of blades 50 in said advancing orbital phases of such rotation of those blades 50. And likewise, during the retreating phases of the orbits of blades 50 with their tips passing rearward over the laterally arched somewhat horizontal roof of fuselage 1 and suitably close thereto as illustrated and as previously explained, those partially compressed coiled resilient springs 143 will expand slightly during said orbital phases of rotation and will thereby increase automatically and cyclically the angles of attack of blades 50 during such retreating orbital phases, when the tips of blades 50 are turning rearward over the top of fuselage 1, which is shown in FIGS. 1 and 6 as being generally cylindrical with the inner tips of the blades 50 extending approximately to the vertical plane including the longitudinal axis of that fuselage, although it will be appreciated that the orbits of slightly longer blades 50 might extend almost across the roof of that fuselage, since it is contemplated that in actual construction (as the previous explanation and to the most easily and compactly drawn diagrams submitted with that application No. 688,318 of Oct. 4, 1957), the blades 50 rotating in opposite directions in unison will be staggered with respect to the blades 50 of the opposite rotor on the other side of the fuselage.

Figure 3:
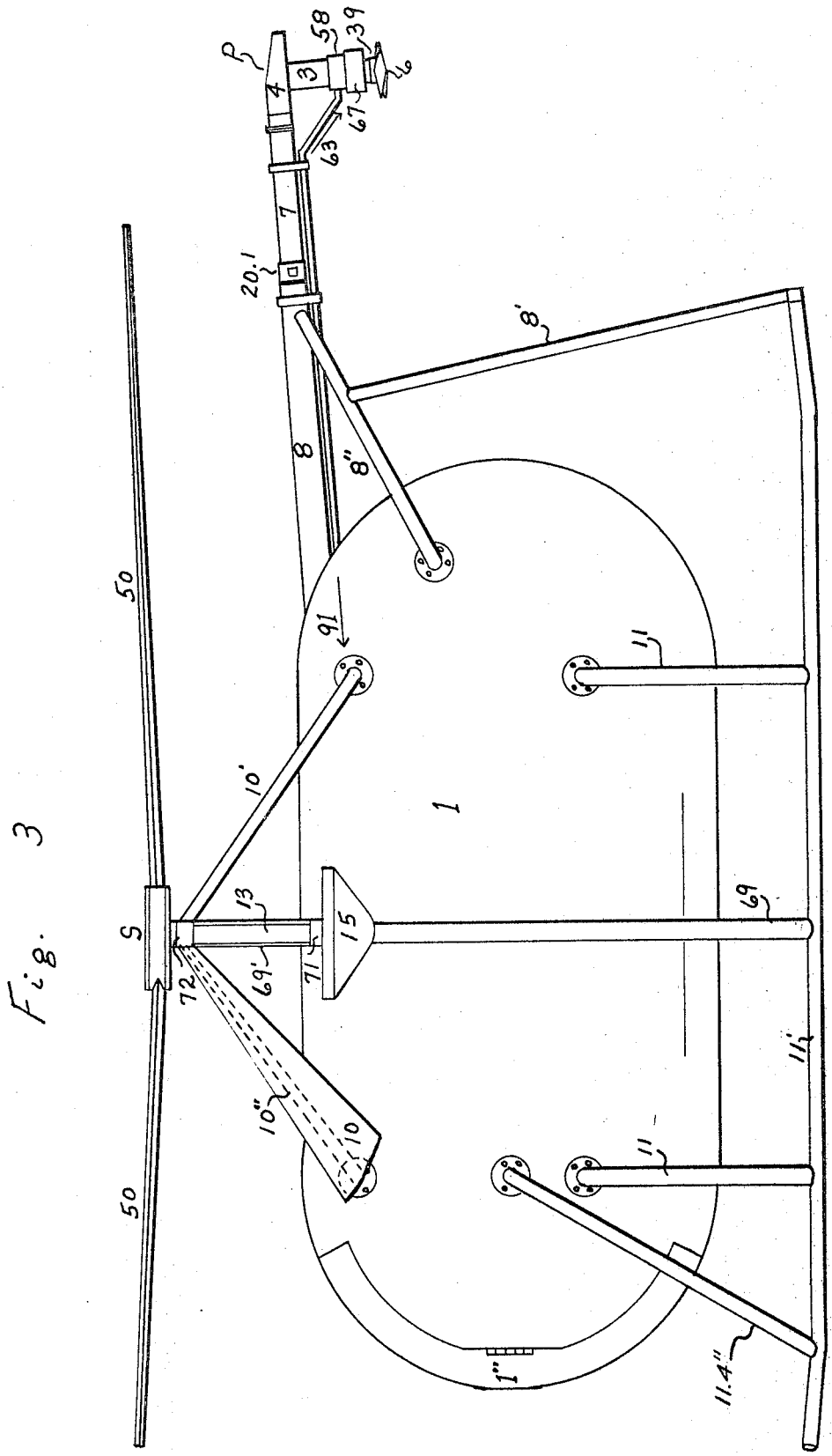
FIG. 3 is a side view at double scale of the aircraft shown in FIG. 1.

Be it noted in this connection that, during the retreating orbital phases of travel of the tips of blades 50 over their respective sides of the laterally arched roof of the generally cylindrical fuselage 1 (over which they may travel as indicated in FIG. 1, with the tips only a few inches above that laterally arched roof as indicated in FIG. 3), the tips of blades 50 are traveling toward the vertical plane including the longitudinal axis of the fuselage during the first half of said retreating orbital phases. And in that forward inner quadrant of their travel the tips of blades 50 tend (as a direct result of the lateral arching of the at least almost horizontally disposed and generally cylindrical fuselage with respect to which the paired sustaining rotors S and S' are suitably disposed as shown in those FIGS. 1, 3, and 6) to build up pressure over the said fuselage roof forward of the upright plane including the axes of shafts 12, for the air beneath those tips of blades 50 during their rearwardly retreating orbital phases is forced slightly rearwardly and outwardly from the respective mounting shaft 12 as well as downwardly against the said laterally arched roof, across which it is deflected upwardly by such a laterally arched roof beneath and against the retreating blades 50 of the paired sustaining rotor on the opposite side of the fuselage, thereby increasing the lift of said air on said blades 50 during the retreating phases of their orbits and thereby making it possible for the aircraft to travel forward in translational flight at speeds up to at least 100 miles per hour in excess of speeds possible (and certainly not safe and practical) by a helicopter having a single main sustaining rotor with necessarily much longer blades to achieve approximately the same lift (at least in hovering) as my aircraft having paired side-by-side mounted rotors, which pass over a much wider swath of air from which to secure their reactionary lift on blades 50 during forward translational flight.

Of course the law of physics known as precession at correspondingly high rotational speeds of my blades 50, having at least almost cantilever pivotal mounting of their roots 111 in brackets 112 at least almost rigidly mounted in outer annular hub members 113 (having substantially fixed configuration) of the inversely paired right and left rotors S and S', makes reactionary lift on the outer tips of retreating blades 50 by air deflected upwardly in traveling across the laterally arched roof of the generally cylindrical fuselage 1 manifest itself at points 90 degrees rotationally rearward from the places of such direct reactionary lift on the blade tips in the forward such quadrants of the retreating phases of the rotational orbits, thereby causing the outer tips of the blades 50 (which are the segments of those blades 50 having greatest leverage on the mounting shafts 12 as well as greatest rotational speed) to be lifted in the rear rotational quadrants of said retreating phases of orbit of the said outer blade tips over the roof of the fuselage, it being contemplated here that the respective orbits of blades 50 of rotors S and S' will extend approximately to the vertical plane containing the longitudinal axis of the generally cylindrical and horizontally disposed fuselage at the plane containing the axes of shafts 12. And it is notable in connection with such cyclical variations of pitch of blades 50 to equalize their lift throughout their respective orbits, by virtue of the automatic cylindrical variations in length of the coiled compression springs 143 (under uniform pressure on each such spring 143 as a result of torque of the engine E on rotationally interconnected shafts 12 mounting respective inversely paired hubs 110), that such cyclical variations of pitch of the blades 50 in response to variations of length of the partially compressed resiliently flexible coiled compression springs 143 takes place without any necessity for rotation of the outer annular hub member 113 relative to the respective mounting shaft 12 fixedly mounting spool members 130, 134, 135, 136, because those flexible coiled compression springs 143 act directly on the respective faces of pressure lugs 147 fixedly attached to respective blade roots 111.

It also is particularly notable (especially in view of the fact that reactionary lift of air on the outer tips of blades 50 are most effective when those tips are only a few inches above the laterally arched roof of generally cylindrical fuselage 1) that the resiliency of flexible annular hub members 128, 129 tends at all times to keep blades 50 (having at least almost cantilever pivotal mounting of their roots 111 in tubular brackets 112 at least almost fixedly mounted in outer annular hub members 113 having substantially fixed configuration) traveling in paths at least almost perpendicular to their respective mounting shafts 12, although those plates 128, 129 permit slight vibration absorbing oscillation of hub members 113 on multiple axes perpendicular to the rotational axes of their respective mounting shafts 12. The gradual limitation by resilient annular plates 128, 129 of such universal oscillation of hub members 113 about the axes of their respective mounting shafts 12 causes minimum vibration of those shafts 12 in their tapered roller bearings 14, which are located immediately below the respective mounting spools 135, 130, 134 fixedly attached to the upper tips respectively of those mounting shafts 12. And, to repeat, the tendency of such gradual limitation of universal oscillation of hub members 113 relative to the respective mounting shafts 12 as well as the gradual limitation of axial movement of those hub members 113 relative to their respective mounting shafts 12 by the resiliency of those annular connecting plates 128, 129 effecting resilient connections respectively (between the inner and outer annular hub members) to make blades 50 rotate in orbital paths at least almost perpendicular to said mounting shafts 12 permits mounting of rotors S and S' on their respective outrigger frameworks at heights with respect to the fuselage at which the tips of blades 50 will travel safely within orbital limits only a few inches above the laterally arched roof of the fuselage 1, thereby giving maximum lift to blades 50 during the retreating phases of their orbits on both sides of the fuselage as a result of the upward deflection of air deflected upwardly in its passage across said laterally arched roof of the generally cylindrical fuselage 1. It follows therefrom, as a result of the increased lift of blades 50 during the retreating phases of their respective orbits with the tips of those blades passing over a portion of the laterally arched roof of the generally cylindrical fuselage 1 somewhat horizontally disposed, that the lift of blades 50 is very considerably more uniform throughout their respective orbits, thereby reducing stresses and resultant destructive vibrations in blades 50 (with consequent noises resulting therefrom in flight), as well as in the hubs 110 mounting those blades 50 on shafts 12, and in the bearings 14 mounting those shafts 12 in the very light weight but satisfactorily strong outrigger frameworks at some considerable necessary suitable equal distances from the said fuselage, although such stresses and vibrations tending to decrease life of those parts of my aircraft also are minimized to some extent by the resiliency of annular plate hub members 128, 129 whereby the outer annular hub members 113 having substantially fixed configuration are connected to the inner spool hub members 130, 134, 135 fixedly mounted on those shafts 12. Note particularly in this connection that the distance between the tips of the blades 50 and the roof of the generally cylindrical fuselage 1 is gradually reduced as those outer tips of blades 50 rotate inwardly toward the vertical plane including the longitudinal axis of that generally cylindrical and horizontally disposed fuselage, thereby gradually increasing the air pressure under the said outer tips of those blades 50 to compensate for the gradually decreasing relative air speed of those blades in the retreating phases of their orbits during rapid forward translation flight. And, even if the length of blades 50 shown in FIG. 1 were lengthened slightly (as is possible by virtue of contemplated rotational staggering of said blades 50 of the paired rotors S and S', as explained previously herein), or if alternatively the front half of the fuselage 1 (forward of the vertical plane including the rotational axes of shafts 12) in that figure were shortened slightly, the hemispherical front tip of that fuselage (with the same approximate diameter as the diameter of the cylindrical intermediate portions of the fuselage to which those hemispherical endwalls are attached) also would tend to make the pressure of air beneath the outer tips of those blades 50 increase gradually as a result of the gradually decreasing distance between the tips of the blades 50 and the roof of the generally cylindrical fuselage 1, when the said outer tips of those blades 50 are rotating rearwardly over the laterally arched roof of said fuselage in forward translational flight.

When my aircraft lands, lower annular resiliently flexible plates 129 of the side-by-side mounted rotors settle downward with respect to their corresponding mounting shafts 12 to give outer annular hub member 113 a broad stabilizing base on very slightly conical but almost horizontally faced spool platform 136, which of course alternatively may be given greater diameter by its extension outward well below the hub member 113. But the rotational momentum of blades 50 having considerable mass will carry outer hub member 113 and the resiliently flexible annular plates 128, 129 (bolted almost rigidly to the outer margin thereof) forward rotationally, until the stop members 140 (mounted fixedly on bolts 139 extending through plates 128, 129, 141, and 142) reach the forward walls of arcuate slots 137 in the outer margin of flange 134 (and similar such arcuate slots 137 in the thicker lower flange 135 if that lower flange be made to correspond that way alternatively, as previously explained). Simultaneously, when the blades 50 cease to rotate, their trailing edges (considerably heavier than the more narrow segments of those blades forward of the respective axes of blade roots 111 in brackets 112) will cause those trailing edges to droop below the respective axes of blade roots 111 in their brackets 112, thereby permitting coiled compression springs 143 to expand to their maximum length. But, when thereafter the power of the engine is applied (by means of shaft 30 in upright tubular housing 31) to shafts 12 in anticipation of another flight, those springs 143 will be compressed, while the rotor hubs 110 are being accelerated, during which time stops 140 will be moved rearward in their arcuate slots 137, until those stops 140 mounted on bolts 139 come in contact with the rear walls of the several arcuate slots 137 respectively. But, as the speed of the rotors S, S' is accelerated, the blades 50 (being disposed with their maximum angles of attack permitted by oscillatory pivotal stops 124) will lift the resiliently flexible annular plates 129 off their formerly stabilizing very slightly conical bases 136 of the respective spools fixedly attached to mounting shafts 12, and the springs 143 as a result of said lifting are permitted to expand slightly forward, as the outer hub member 113 tends to move forward rotationally to a few degrees on lifting of the weight of each of the S, S' rotors from the respective almost horizontal face of very slightly conical plate 136, after which time bolts 139 and their rigidly attached stop members 140 in flight will remain continually intermediate the rear and front walls of arcuate slots 137 in the outer margin of spool flange 134, as indicated in FIG. 10, the axes of blade roots 111 of each said rotor being pivotally oscillated forward rotationally in unison around the respective mounting shaft 12 just enough (with respect to the rear walls of gaps 145 in the outer margin of the truncated very slightly conical platform 136, non-rotatably mounted on shaft 12, as a result of the resiliency of all three coiled compression springs 143 in unison) to produce collective pitch of blades 50 exactly suited (for effective rotational speed and lift) to the torque being applied on its drive shaft by the engine (or even complete lack of any such torque on central drive-shaft 30 by the engine E drive-shaft) to the rotationally interconnected rotor-mounting shafts 12.

Attention is invited particularly to the fact that, although the resiliency of flexible annular plates 128, 129 affords limited means of absorbing rotational shock from the spools 130, 134, 135 on the annular outer hub member 113 (providing almost cantilever almost rigid mounting therein of tubular brackets 112, in which are pivotally oscillatable the cylindrical blade roots 111 fixedly rigidly attached to their respective blades 50 in at least almost longitudinal alignment with the respective axes of said roots 111 in said brackets 112), whenever stop members 140 (mounted by means of nuts 138 screwed on tip-threaded bolts 139 respectively extending through corresponding holes in the inner margins of said resiliently flexible annular plates 128, 129 between the perforated annular metal plates 141, 142) might come in contact rather suddenly with the rotationally forward or rearward walls of arcuate notches 137 in the outer margin of annular flange 134 of the said spool as a result of sudden increase or decrease of the power of the engine's drive-shaft generating torque on the rotationally-interconnected rotor-mounting shafts 12, it is significant that at the same time that torque of those rotor-mounting shafts 12 is applied primarily to blades 50 directly by means of the multiple shock absorbing stiff resiliently coiled compression springs 143 (having their respective longitudinal axes disposed at a slight angle with respect to a plane perpendicular to the axis of their respective hub-mounting shaft 12 at suitable equal distances from said shaft, to which they are tangential at approximately right angles normally), whose rotationally rear tips, (slidably mounted on cylindrical flanges 144 fixedly attached to the rotationally rear walls of suitable at least almost right-angle gaps 145 in the outer margin of otherwise circular very slightly conical platform 136 fixedly mounted on the respective shafts 12), are at least almost fixed with respect to the mounting shaft 12, and whose rotationally forward tips (capable of moving in all directions within limits of the resiliency of said coiled compression springs 143) mounted slidably on the respective cylindrical fingers 146 press their forward ends directly against the respective annular faces around said fingers 146 of lugs 147 attached fixedly and off-center to respective pivotally mounted cylindrical blade roots 111, which also have rigidly attached thereto suitable oscillatory stops 124 extending through slots 123 in the respective walls of tubular brackets 112, whereby is limited finally the variations in angles of attack of blades 50 individually as well as collectively.

It will be noted, however, that the stops 124 limiting the pivotal oscillation of roots 111 of blades 50 within the limits of the respective slots 123 in the walls of tubular brackets 112 inclosing those blade roots 111 during normal engine-powered flight of the aircraft do not come in contact with the edges of slots 123 at all, just as the stops 140 do not come in contact for the most part during ordinary engine-powered flight with the walls of arcuate slots 137, for the means of adjusting rotation of outer annular hub member 113 relative to its mounting shaft 12 works in complete and immediate collaboration with the means of adjusting the pitch of blades 50 individually and cyclically as well as in unison collectively. As indicated previously, on landing of my aircraft its blades 50 of side-by-side mounted main sustaining rotors S and S' their rotational momentum will carry the outer annular hub members 113 forward respectively around their respective mounting shafts 12 until stops 140 rest against the front walls of arcuate marginal notches 137 in spool flange 134; and, as the rotors S, S' cease to turn around their mounting shafts 12, the trailing edges of blades 50 thereof will tend to droop gradually with respect to the respective axes of their blade roots 111 in outer annular hub members 113. But, when on the next flight the torque of the engine's drive-shaft on its rotationally interconnected rotor mounting shafts 12 tends to compress the springs 143 (thereby rotating blade roots 111 in unison around respective said shafts 12 and simultaneously keeping those blade roots 111 so oscillated pivotally in their respective at least almost cantilever mounted tubular brackets 112 that the angles of attack of blades 50 are maximum for an instant at least), the gradually rotationally accelerating blades 50 will tend to lift their respective outer annular hub members 113 and their at least almost fixedly attached resiliently flexible annular connecting plates 128, 129 from the respective almost flat very slightly conical platforms 136 of the spools fixedly attached to the upper tips of rotor mounting shafts 12 and shortly thereafter will pull the respective upper annular metal plates 142 (having substantially fixed confirmation) up against the respective upper flanges 134 of said spools, on which the craft is sustained in flight by virtue of the paired opposing tapered upper roller bearings 14 and corresponding lower bearings 14' mounting shafts 12 in the expanded tips of tubular outrigger framework tubular housings 13.

In the meantime, however, pressure of coiled compression springs 143 on rotationally-rear faces of their respective pressure lugs 147, fixedly attached to cylindrical blade roots 111 (below the respective axes thereof in tubular brackets 112) off-center in each instance by a suitable small amount (depending, as explained previously on the size and chord configuration of the airfoils of blades 50 of equal size, as well as on the respective disposition of the longitudinal axes of blade roots 111 with respect to the longitudinal axes in each instance of blades 50, to which they are fixedly attached at least almost in alignment), exerts a torque on each of the respective said blade roots 111 around said pivotal axes in said tubular brackets 112 substantially equalling the torque around the same said axes respectively by the rotational drag of surrounding air on blades 50, so that at any time the angles of attack of blades 50 (cyclically as well as in unison or collectively) respectively remain just enough displaced from their neutral drag postures in the surrounding air to correspond with the pressure exerted on springs 143 by the rotational torque of the engine's drive shaft on rotationally interconnected rotor-mounting shafts 12, whether that engine may be exerting its full power, or only a small fraction of such potential power (at the election of the pilot or otherwise), or no power at all (at the election of the pilot or otherwise). The pilot thus has to pay no attention whatever to pitch of blades 50 of the paired sustaining rotors S and S', for there thus is no danger whatever of stalling of airflow on the respective airfoils of blades 50, which continue to rotate at sustaining rotational airspeeds regardless of the power and resultant speed of the engine's drive-shaft on its torque-actuating over-running clutch, of a construction well known in the art.

Note again that it is not necessary for the pitch of each of the blades 50 to vary completely in unison, although the pressure on coiled compression springs 143 is to be substantially the same by shafts 12 at any moment, and although the pitch of the blades 50 may vary in unison as a result of increased or decreased torque of the engine's drive-shaft on rotationally interconnected rotor-mounting shafts 12. Resilient coiled compression springs 143 can vary in length individually in response to variations of drag on the trailing edges of the tips of respective blades 50, as those blades 50 pass from advancing to retreating phases of their obits (during rapid forward translational flight causing cross currents of air with respect to the mounting shafts 12) thereby permitting and causing blades 50 to change their angles of attack cyclically and individually and thus to equalize lift of the blades 50 throughout their respective orbits and in turn to minimize any necessity otherwise for universal oscillation of outer annular hub members 113 (providing at least almost cantilever mounting therein of blade roots 111 pivotally mounted in tubular brackets 112) with respect to the axis of the respective mounting shaft 12 for that purpose. In this respect it will be noted that, for the purpose of varying the pitch of blades 50 individually by pivotal oscillation of their substantially fixedly attached blade roots 111 in their respective tubular brackets 112, those blades 50 are substantially balanced on the points at which respective longitudinal axes of cylindrical fingers 146 are bisected by the abutting faces of the respective front tips of springs 143 mounted thereon and the corresponding pressure lugs 147 against which in normal engine-powered flight is exerted pressure by those resiliently flexible coiled compression springs 143, whose forward tips can and do move with almost complete freedom in all directions with respect to their rear tips (mounted on the fingers 144 attached fixedly to the outer margins of conical platforms 136 fixedly attached to respective shafts 12) in order to permit oscillatory universal and axial and rotational movements (both simultaneously and individually) of each outer annular hub member 113 with respect to its mounting shaft 12 and to permit (both simultaneously and individually) oscillatory pivotal movement of blade roots 111 in their respective pivotal mounting brackets 112 for the purpose of adjusting pitch of blades 50 individually and collectively in response to amount of torque (as well as complete lack of such torque) of the engine's drive-shaft on rotationally interconnected rotor-mounting shafts 12.

The foregoing is particularly evident in FIG. 15, in which a rotationally forward extension of the longitudinal axis of cylindrical mounting finger 14 (as well as of the longitudinal axis of cylindrical mounting finger 146 (as well as of the longitudinal axis of mounting finger 144 at the moment and of coiled compression spring 143 mounted slidably thereon) would be a line passing only about a quarter of an inch below the axis in its tubular bracket 112 of cylindrical blade root 111, which in this particular instance might have coincided with the longitudinal axis of blade 50 (except for the normal bending of such a blade toward its outer tip). In fact, such a blade 50 might be workable even if the line representing a forward extension of the longitudinal axis of its mounting finger 146 was just exactly perpendicular to the axis of cylindrical blade root 111, since the front tip of the coiled compression spring slidably mounted on such a cylindrical finger 146 is slightly above the rotationally rear tip of that spring 143 mounted on finger 144 substantially fixed with respect to the mounting shaft 12. But, whether a line representing the forward extension of the longitudinal axis of finger 146 would pass only a very short distance below the cylindrical blade root 111 (as is indicated in FIG. 14 for a blade 50 having its longitudinal axis only parallel to the axis of its root 111 in its bracket 112, but slightly rearward thereof, as would be indicated by optionally alternative FIG. 13), or whether the entire front tip of spring 143 alternatively be disposed below the tubular bracket 112 as well as its telescoped pivotally mounted cylindrical blade root 111 (as indicated in FIG. 24 for mounting blades 50 having their respective longitudinal axes disposed at a slight fixed angle with respect to the axis of blade root 111 in its bracket 112, as is indicated for blades 50 shown in FIG. 1), the points at which the longitudinal axes of fingers 146 are intersected by the faces of the forward tips of coiled compression springs 143 and their abutting faces of off-center pressure lugs 147 fixedly attached to blade roots 111 serve as respective pivot points for application of pressure by each of those multiple springs 143 in response to torque of the engine on shafts 12 to keep each of the blades 50 disposed at proper pitch (both individually and cyclically as well as in unison) commensurate with the amount of power being developed at any moment by the engine E mounted in the fuselage.

While pressure lugs 147 fixedly attached to respective blade roots 111 (pivotally oscillatable within limits in their respective tubular brackets 112 as well as rotatable in unison within limits around the mounting shaft 12) are free to move in all directions within said limits with respect to the rear tips of springs 143 mounted on fingers 144 substantially fixed with respect to the respective mounting shaft 12, it will be noted that each of the coiled compression springs 143 (slidable with respect to both their mounting fingers 144 and 146) correspondingly have sufficiently close fit around those cylindrical fingers 144 and 146 having rounded adjacent tips that those resilient coiled compression springs 143 tend to keep blades 50 disposed at angles of attack normal for most efficient lift in most circumstances, even though the automatic means of adjusting blade pitch will cause cyclical variations therefrom of blade pitch to accommodate special circumstances such as cross currents of air (due to rapid forward translational speed of the craft or otherwise) as well as to accommodate variations in the torque of the engine's drive-shaft. It is contemplated that the several resilient coiled compression springs 143 (one for each of the blade roots 111, whether the rotor alternatively have two, three, four, or even more blades 50 symmetrically disposed around the respective mounting shaft 12) would be exact duplicates. But, in case the springs 143 might be slightly different (by accident of manufacture or otherwise), and in order to compensate for any such difference by inserting a washer on one or more of the rotationally-rear fingers 144, those suitably designed fingers 144 may be attached fixedly to the rear walls of marginal gaps 145 in the conical platform 136 alternatively by means of bolts extending through flanges attached fixedly to those fingers 144 and through corresponding holes in the margins of that conical platform spool member 136 as indicated by broken lines in FIGS. 13, 14 and 15.

Figure 2:
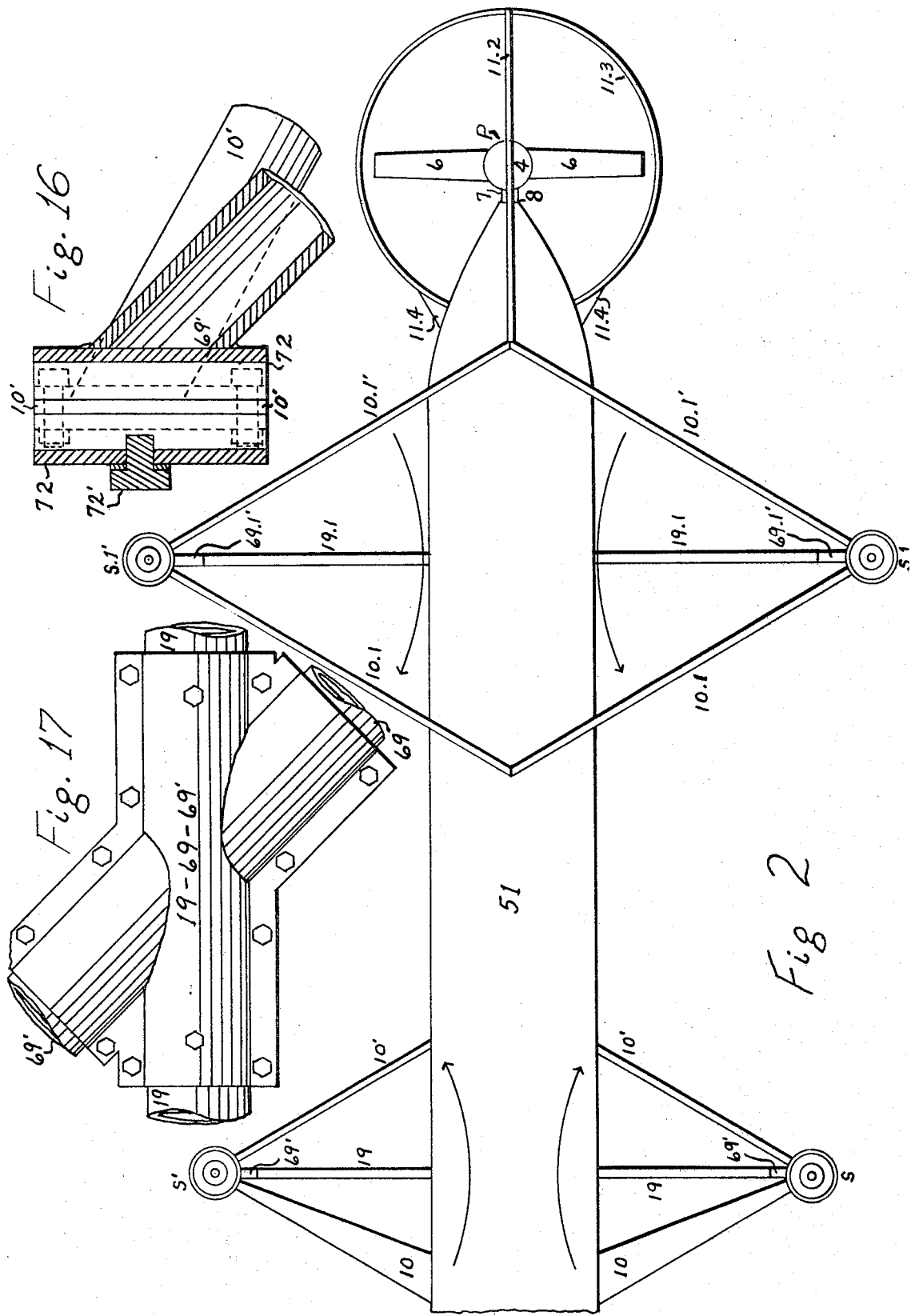

While the above described rotor hubs 110 are designed especially for use in rotary wing aircraft having sustaining rotors mounted side-by-side on shafts rotationally interconnected and driven by an engine in the fuselage in response to the special requirements and advantages of such an aircraft (properly called a Lateral Autocopter), on which other kinds of rotor hubs would not be suitable or even usable, it will be appreciated that features of the same rotors I have described generally would be more efficient and desirable in at least some respects for safety and other reasons for use on other kinds of aircraft, particularly on presently well known helicopters having a single main sustaining rotor whose rotational effect on the fuselage is countered by an auxiliary tail rotor having its rotational axis mounted at an angle with respect to the axis of the larger sustaining rotor. It will be appreciated, however, that such a helicopter sustaining rotor (having longer and necessarily more flexible blades turning at fewer revolutions per minute in order to keep tip speed of the longer blades below that of sound) would need more flexible mountings in the outer annular hub member 113 of its tubular brackets 112, which also in such helicopter alternatively should be tilted upward toward their rotationally rear ends, in order to afford a more conical flight path of the blades 50 around their mounting shaft 12, thereby adding strength to the said longer flexible sustaining rotor blades by virtue of centrifugal force on them in flight (even at a sacrifice in effective vertical lift) as well as keeping their blade tips from drooping excessively below the mounting hub after landing. In my drawings (for ease of drafting as well as for other purposes for my rapidly rotating blades 50 of paired side-by-side sustaining rotors S and S' indicated in FIGS. 1 and 2) the axes of blade roots 111 are shown as being in a single plane normally perpendicular to the mounting shaft 12, but it is quite easy alternatively to make those axes of tubular brackets 112 tilt upward slightly toward their rear ends from such a perpendicular plane and give them a slightly more flexible mounting in the outer annular hub member 113 in the following process. First, alternatively space parallel annular flange segments 126 and 127 of outer annular hub member 113 a little farther apart in order to accommodate between said flanges 126 and 127 for each blade root 111 a suitable tubular cylindrical hose (made of rubber impregnated fabric woven from cotton thread, of the kind that often is used in hoses otherwise employed for conveying water from automobile radiators to their engine blocks) several inches in length installed snugly around the midsection of each of the tubular brackets 112 and within the horizontally disposed U-shaped sheave of outer annular hub member 113 (having substantially fixed conformation) between its parallel annular integral flange segments 126, 127. Next, instead of milling the arcuate notch in the middle of the rotationally front tip of each of the tubular brackets 112 (including the diagonally disposed vertical reinforcing plate 116 welded thereto and partially closing that front tip of said bracket 112) as indicated was done previously in constructing a hub 110, such an arcuate notch in the rotationally-front tip of each such cylindrical tubular bracket fitting the rear cylindrical wall of the rotationally-rear tip of the preceding such tubular cylindrical bracket 112 (pivotally mounting therein the cylindrical blade root 111 of the respective blade 50) alternatively would be milled cylindrically around an axis a small fraction of an inch higher than the longitudinal axis of the tubular bracket 112 in which such forward notch is being milled, thereby alternatively pulling the front tip of each such tubular bracket 112 downward (on installation in the horizontally disposed U-shaped sheave of outer annular hub member 113) toward that sheave's lower annular flange 127 and simultaneously tilting the rotationally rear tip of said tubular bracket 112 upward toward its rear tip with the resiliently flexible rubber hose (alternatively having notches in the tips thereof) installed around the midsection of each such tubular bracket 112 serving as a suitable very slightly flexible mounting thereof in the sheave of the outer annular hub member 113 having a substantially fixed conformation.

It will be appreciated that a number of other alternative departures may be made from the construction of parts shown in the diagrammatic drawings without departing from the principles of the present invention. For instance, the coiled compression spring-mounting cylindrical fingers 144 installed at the rear walls of gaps 145 in the outer margin of very slightly conical platform 136 (as indicated in FIGS. 10, 12, 14, 15) rigidly mounted on rotor-mounting shaft 12 alternatively may be replaced by cylindrical cups slidably mounting the rear tips of such coiled compression springs 143. And in either instance such mountings for the rear tips of springs 143 alternatively can be attached to the platform 136 adjacent its outer margin by threaded means making it possible to adjust said mounting members 144 peripherally with respect to said very slightly conical platform 136, although the coiled compression springs 143 tend to adjust their lengths anyway, because in flight the rotationally oscillating stop members 140 mounted on bolts 139 (inserted perpendicularly through the resiliently flexible annular plate members 128, 129 almost rigidly attached to the outer annular hub member 113 as indicated in FIGS. 10, 11) remain approximately midway between the front and rear walls of the arcuate slots 137 in spool flange 134, as indicated in FIG. 10.

In lieu of the quite simple and inexpensive annular plates 128, 129 (requiring no lubrication and being readily adaptable to great variations of air temperature), which are made of resiliently flexible material (consisting of multiple plies of cross-woven fabric made of cotton and nylon threads between which is implanted flexible synthetic rubber), and which are almost rigidly attached by means of multiple bolts 14, 15 to the outer annular hub member 113 (having substantially fixed conformation providing to at least almost cantilever pivotal mounting of blade roots 111 in tubular brackets 112 thereof) thereby providing means of rotating blades 50 around the axis of respective mounting and rotating shaft 12, but which also are rotatable with respect to said shaft 12 within limits of stop members 140 in their respective arcuate slots 137 in the outer margin of spool flange 134, and which by virtue of their resilient flexibility permit and cause outer hub 113 to move axially with respect to shaft 12 within gradually restricting limits of said resiliently flexible material of suitable stiffness, and which simultaneously by virtue of that same resilient flexibility permit universal oscillation (on multiple axes perpendicular to the axis of mounting shaft 12) and gradually limit such universal oscillation, thereby imparting to said upright shaft 12 the gyroscopic stabilizing tendencies of the three rapidly rotating blades 50 of each such hub 110 (imparted to the outer hub member 113 by means of at least almost cantilever mounting in tubular brackets 112 of blade roots 111 substantially fixedly attached to said blades 50 respectively in at least almost alignment with the axes of blade roots 111 in tubular brackets 112), it is possible alternatively to provide a much more complicated and expensive and less efficient (in operation and upkeep) arrangement mounting each outer annular hub-member 113 on its shaft 12, which thereby would be subject to more vibration as a result of said alternative mounting arrangement to be described presently. Although no one else ever has done so, it alternatively is possible on one of my aircraft to mount outer annular hub member 113 (providing at least almost cantilever mounting of more than two blades 50 rotating in the same orbital flight path) universally on an inner hub member (at substantially the same level as said inner hub member loosely inclosed thereby) to be mounted on shaft 12 by employing cross pivots such as those of a gimbal ring and otherwise; and it also is possible to mount the said inner hub to move slightly axially with respect to shaft 12 subject to gradual limitation of such axial movement of a coiled compression spring mounted around said shaft 12, which turns the rotor. But there are two other requirements for my hubs 110 that have to be met simultaneously. First of all, in order to provide the primary lateral stability of a craft as shown in FIG. 1 and having paired side-by-side mounted rotors S and S' on upright shafts 12, there must be provided suitable means gradually limiting the universal oscillation of outer hub member 113 relative to the mounting shaft 12, not only to limit vibration in the light outrigger framework at considerable suitable distance from the fuselage, but to impart to the respective contra-rotating shafts 12 the gyroscopic stabilizing tendencies of their respective rotors S and S'. Such gradual limitation of universal oscillation of outer annular hub member 113 relative to its mounting shaft 12 may be effected alternatively by installation of a resiliently flexible rubber washer around the mounting shaft 12 in some instances and by employment of a conically spiraling coiled compression spring around said shaft 12 in other such installations. But it still is necessary simultaneously to make outer annular hub member 113 rotatable around shaft 12 within small limits, such as those afforded in FIGS. 10 and 11 by the stop members 140 rigidly attached to bolts 139 and disposed between the front and rear walls of arcuate slots 137 in the outer margin of spool flange 134. And in lieu of the rotational stops 140 just mentioned it is possible alternatively to provide axially disposed splines on a cylindrical member such as that indicated by numeral 130 in FIG. 11 and to mount around those splines grooves several degrees wider and disposed axially in the surrounding inner hub member connected flexibly by cross pivots to the outer hub member 113.

But, regardless of whether outer annular hub member 113 (mounting almost fixedly tubular brackets 112 inclosing blade roots 111), alternatively is limited in its rotary oscillation around its mounting shaft 12 by oversize axially disposed grooves in an inner cylindrical hub member inclosing the smaller axially disposed splines mounted rigidly on said shaft as mentioned in the preceding paragraph, or whether, as previously described and illustrated, such rotary oscillation of the blade roots with respect to their mounting shaft may be limited by the front and rear walls of notches 137 in annular flange 134 of the spool in which stops 140 are rigidly mounted on bolts 139 protruding upward through resiliently flexible annular connecting plates 128, 129 interposed between the inner and outer annular hub members 130 and 113 respectively, it will be understood that, in normal flight with a suitable load on an engine having at least some additional limited reserve power, the outer annular hub member 113 will be disposed about halfway intermediate its forward and rearward rotational limits imposed by such rotation limiting means, so that rotational shock on the rotors S and S' by variations of torque of the engine's drive-shaft on the rotor-mounting shafts 12 will be absorbed by the combined resiliency or coiled compression springs 143 (spaced equally from the mounting shaft 12, to which they are disposed tangentially, and from each other in a symmetrical disposition), whose respective rotationally rear tips are suitably mounted by means such as cylindrical fingers 144 protruding into gaps 145 in the outer margin of conical platform 136 (nonrotatably and at least almost rigidly mounted on shaft 12), and whose respective rotationally forward tips are suitably attached (by means such as cylindrical fingers 146 inserted in said tips of the coiled compression springs 143 slidable thereon) to an off-center lug 147 fixedly attached to the respective cylindrical blade roots 111, which (by virtue of the disposition in normal flight of outer annular hub member 113 intermediate its forward and rearward oscillatory rotational limits around the mounting shaft 12 with respect to which it is rotatable within those limits) not only are free to oscillate rotationally within oscillatory limits with respect to the shaft 12 mountng its respective outer annular hub member 113, but also are free to oscillate pivotally within their respective tubular at least almost cantilever mounting brackets 112, the forward tips of the respective coiled compression springs 143 (having their respective longitudinal axes disposed at slight angles from a plane perpendicular to mounting shaft 12 and in normal powered flight at somewhat right angles to the axes of their respective cylindrical blade roots 111 in brackets 112) exerting their forward pressure on respective lugs 147 at points just sufficiently below the respective axes of the blade roots 111, to which those pressure lugs 147 respectively are attached rigidly, that the forward pressure of each spring 143 will just exactly balance the torque on its respective blade root 111 exerted by the drag of the trailing segment of its blade 50 (including the lift thereof) around that same pivotal axis at all times. Thus, by virtue of the foregoing construction, while the coiled compression springs 143 operative in unison in normal powered flight will determine the rotative disposition of their outer hub members 113 relative to their mounting shafts 12 intermediate the oscillatory rotational limits otherwise determined by stops 140 in arcuate marginal gaps 137 in spool flange 134, the resiliency of these same coiled compression springs 143 acting independently of each other (and directly on each respective blade root 111 by means of respective off-center lugs 147 fixedly attached thereto) will exert just the right amount of torque on respective blade roots 111 in their tubular brackets 112 mounted almost fixedly in that outer annular hub member 113 to determine at all times just the right amount of blade pitch individually and cyclically, so that in rapid forward translational flight of the aircraft each blade 50 will have slightly increased angle of attack during the retreating phase of its orbit (adjacent the fuselage over a portion of which the tips of the blades 50 will pass closely thereto) and decreased angle of attack during the advancing phase of its orbit (out beyond the mounting shaft 12), thereby providing suitably equalized lift of blades 50 of each rotor throughout their orbits around their respective mounting shafts 12.

But, since vibration is such an increasingly important factor in rotors mounted side-by-side on light outrigger frameworks at suitable considerable distance from the sides of the fuselage with little resistance (by those simple frameworks having a minimum number of parts) to downward flow of air from the blades 50 as illustrated in FIG. 1, it is particularly notable that, in addition to the foregoing means whereby the angles of attack of blades 50 are changed cyclically during rapid forward translational flight by means of coiled compression springs 143 actuated by torque of mounting shafts 12, and in addition to the previously mentioned tendency of the tips of rotors S and S' of blades 50 so disposed to direct some air across the laterally arched and at least almost horizontally disposed roof of the generally cylindrical fuselage 1, which thereby tends to deflect such downwashed air upward against the retreating blades 50 on the opposite side of that fuselage and thereby also tends to increase lift of blades 50 at their outer tips when above said fuselage (where such lift at the tips of the blades 50 is most effective in countering lift of said blades 50 on the opposite outer sides of mounting shafts 12 during the advancing phases of their orbits, in which the angles of attack of said blades 50 are correspondingly inversely decreased by slight cyclical contraction of the respective resilient coiled compression springs 143 individually without any need for any alternative rotation of outer annular hub member 113 with respect to its mounting shaft 12 to accomplish such variation of angle of attack of the blades 50), my outer annular hub members 113, which provide at least almost cantilever mounting of cylindrical roots 111 of blades 50 fixedly attached thereto of more than two blades each in the same orbital paths and thereby tend to minimize vibration of the rotor hub (because each blade 50, so mounted to describe substantially the same orbital path at least in a single plane around the almost outer annular hub member 113 having substantially fixed configuration substantially perpendicular to the rotational axis thereof, tends to prevent any twist of hub member 113 by the other blades 50 having at least almost cantilever mounting therein), can oscillate slightly universally with respect to the axis of the respective mounting shaft 12 (thereby finally equalizing any variations in lift of the various blades 50 throughout their orbital phases) and thus by such oscillation (on multiple axes perpendicular the respective mounting to shaft 12) during their orbits will tend to remove unnecessary stresses in the blades 50 and in their respective hubs 110 as well as in the bearings 14, 14' of shafts 12 mounted in the outrigger frameworks at considerable suitable distances from the sides of the fuselage.

Yet, in spite of the fact that outer annular hub members 113 can oscillate universally with respect to their respective mounting shafts 12 to relieve any such vibrational stresses and strains on the various parts of the rotors S and S' and their mounting means (that otherwise might limit the life of those parts to increase maintenance costs, even if the results did not happen to prove disastrously fatal), it will be noted that the resiliency of the flexible annular plates 128, 129 (or any other practical means of mounting with the desired characteristics, as described previously herein in connection with one or even two resiliently flexible coiled compression springs linking the outer hub 113 around the inner hub assembly fixedly mounted on the tip of its mounting shaft 12) will impart lateral stability to the craft sustained by said side-by-side mounted rotors S and S' turning in opposite directions, because the gyroscopic stabilizing tendencies of blades 50 having their respective roots 111 pivotally mounted in brackets 112 at least almost rigid in outer annular hub members 113 will be transmitted without without any appreciable vibration to the respective mounting shafts 12 (disposed at least almost vertically in hovering) by the stiffness of those resiliently flexible annular members 128, 129 (and alternatively by any such substantially equivalent resiliently flexible counterparts as described herein), which attach the outer annular hub members 113 respectively to the inner hubs 130, 134, 135 fixedly mounted on said shafts 12 respectively. And note again in this connection that, while those resiliently flexible annular hub members 128, 129 will permit the weight of their respective rotors S and S' to settle down on very slightly conical platforms 136 (substantially fixedly mounted on shafts 12), when the craft lands, in flight at other times outer annular hub members 113 are lifted up with respect to spools 130, 134, 135 (by blades 50 mounted in those outer annular hub members 113) to such extent with respect to their respective mounting shafts 12 that those rotating shafts 12 (by which the fuselage is lifted by their mounting out-rigger frameworks attached to each side of the fuselage) simply "float" on the respective resiliently flexible annular hub members 128, 129, which thus absorb all shocks of rough air currents, that otherwise might be felt by the passengers in the fuselage 1, in addition to the fact that the resiliently flexible annular plates 128, 129 absorb all vibrations in the rotors S and S'.

In very large rotors having long blades 50, whose tips are widely separated from each other by virtue of the length of such blades 50, it is possible alternatively to mount four tubular blade-root mounting brackets 112 in an outer annular hub member 113, as was shown diagrammatically in my application Ser. No. 688,319 (filed simultaneously with my copending application Ser. No. 688,318 on Oct. 4, 1957, and disclosing four blades mounted in a single sustaining helicopter rotor mounted rotatably on an upright tubular pylon rather than on a driving mounting shaft 12 as shown in attached FIGS. 10, 11, 12). And obviously it is possible (but perhaps not practical) to leave out alternate blade roots 111 from the tubular brackets 112 in the outer annular hub member 113 of such a four-blade rotor to transform it alternatively into a rotor having two blades 50, although vibration of such rotors would be excessive in the outrigger frameworks. But, to make more stiff the hub 110 of such a rotor having only two blades 50, which would subject the hub thereof to twisting vibrations by virtue of the fact that no blade would be disposed longitudinally at an angle with respect to the longtiudinal axis of another such blade 50, it obviously would be possible alternatively to make the hub 110 more rigid (apart from the resiliently flexible members 128, 129 connecting members 113 to their mounting shafts or some alternative more complicated and expensive counterparts performing somewhat the same functions, as previously described above) by omitting the strap clevices 118 entirely from hubs 110 and making the outer edges of parallel flanges 126 and 127 of outer annular hub member 113 (as well as corresponding resiliently flexible annular hub members 128, 129 almost rigidly bolted thereto by multiple bolts 14, 15) describe polygons extending respectively over and under tubular brackets 112 just far enough to accommodate additional upright bolts 14 illustrated in FIGS. 10, 11 and 12. In this same connection it will be appreciated that the outer annular hub members 113 (whether made circular as indicated in FIGS. 11 and 13 or alternatively made with their outer edges forming polygons as described immediately above) alternatively may be made more rigid also by making somewhat broader the vertical segment 151 of flange 150 bolted to the outer margin of resiliently flexible annular plate 128 by means of the same multiple bolts 14, 15, in which event arcuate gaps will be cut in vertical flange segment 151 (as indicated in FIGS. 14 and 15) to accommodate the chosen number of tubular brackets 112, whose mounting in outer annular hub member 113 thereby will be made more inflexible horizontally as well as vertically.

Obviously several structural variations may be made in construction of outer annular hub members 113 having substantially fixed conformation, according to the amount of rigidity therein that is desired and required for different purposes. In FIG. 11 it is indicated that the sheave-like outer annular hub member 113 is a single piece member having two parallel integral annular flanges 126 and 127; but, because such an integral almost rigid member 113 when made of steel alloy would be expensive to form by other means on an engine lathe, it is indicated in FIG. 24 that the outer annular hub member 113 alternatively may be formed in two identical halves (upper and lower), which then can be welded together as indicated by the horizontal rather heavy line in that figure at the midsectional plane of juncture of the two halves, although a suitable number of bolts 14 and 15 would unite upper and lower halves of the outer annular hub member 113 for most purposes without need of such welding, particularly with such upper and lower halves having inversely corresponding annular shoulders at their annular place of juncture. And incidentally such upper and lower annular halves of outer annular hub member 113 alternatively may be made to unite somewhat angularly at their annular line of juncture instead of forming rounted horizontally disposed U-shaped cross sections (vertical at the midsectional plane of juncture) as indicated in FIGS. 23 and 24. Likewise the plane of juncture of such upper and lower annular halves of said outer annular hub member 113 alternatively may be formed as a substantially horizontal polygon conforming in the number of symmetrical segments thereof to the number of tubular brackets 112 to be mounted in the sheave instead of being circular as in those diagrammatic drawings 10, 11, 12 and in alternate FIG. 13.

But, in order to avoid unequal stresses therein and possible resultant rupture of resiliently flexible annular plates 128 and 129 (by long continued flexing thereof in sustaining the craft) to be made of suitably reinforced rubber impregnated plies of cross-woven cotton fabric identical with that now used extensively in making power transmission belts, it is almost necessary that the outer edge of somewhat smaller diameter substantially rigid annular plates 141 and 142 (by which resiliently flexible annular plates 128, 129 have their inner margins restricted by bolts 139 and nuts 138) be made perfectly circular as indicated in FIGS. 10 and 13. While it has been indicated in FIGS. 10, 11 and 12 that resiliently flexible annular hub members 128 and 129 respectively are made of one piece of material, it will be appreciated that alternatively those same plates 128 and 129 respectively can be formed (somewhat less desirably in all respects except costs of securing broad rubber-belting material of unusual thickness and width in some circumstances) of cross laminations of more narrow strips of such resiliently flexible material presently used for making such broad and relatively thick power transmission belts.

Although in the foregoing descriptions of the accompanying diagrammatic figures it has been indicated that the cylindrical blade roots 111 are to be installed pivotally inside the respective tubular brackets 112 not quite rigidly mounted in outer annular hub member 113, it also will be appreciated that alternatively those tubular cylindrical blade roots 111 may be made to telescope around and be mounted to oscillate pivotally within limits on substantially centilever mounted cylindrical arms (having axes corresponding to those of tubular brackets 112) substantially fixedly attached to an alternative outer annular hub member 113, which thereby can be made alternatively somewhat smaller and of lighter weight than those blade roots 111 mounted in tubular brackets 112 shown in the drawings, when made to operate somewhat similarly in conjunction with a suitable resiliently flexible conically spiraling coiled compression spring (or alternatively two such springs intertwined) mounted between the inner and outer annular hub components in lieu of the resiliently flexible annular plates 128, 129 shown in FIGS. 10, 11, 12.

But, regardless of the nature of my resiliently flexible mounting of outer annular hub member 113 on its inclosed somewhat cylindrical fixedly mounted central hub member 130, below which is nonrotatably mounted around shaft 12 a framework platform 136 having attached thereto means 144 slidably mounting the rear tips of resiliently flexible coiled compression springs 143, it will be noted that those coiled compression springs 143 (disposed at corresponding slight angles with respect to a plane perpendicular to the respective mounting shaft 12, from which said springs 143 are equally spaced as well as from each other) will operate just the same in spite of any oscillation of the outer annular hub member 113 on an axis (and axes) perpendicular to the rotational axis of the respective mounting shaft 12. That is to say, the operation of the parts in conjunction with each other will be the same in such pivotal or universal oscillation of a hub member 113 with respect to its mounting shaft 12; and such pivotal oscillation on an axis (and axes) perpendicular to the axis of the mounting respective shaft 12 will not substantially affect the rotation of the blades 50 around the axis of shaft 12 by means of the compressed coiled compression springs 143 acting in unison on the respective blade roots 111 by means of their respective off-center mounted lugs 147, which mount the front tips of springs 143 on their respective rearwardly protruding fingers 146, and which are rigidly attached to the respective cylindrical tubular blade roots 111 (whether each such blade root 111 be mounted inside a tubular bracket 112 as shown in the diagrams illustrating a construction most preferable in many respects, or alternatively may be mounted to telescope and oscillate pivotally within limits on cylindrical arms serving substantially the same purpose in almost cantilever pivotal mounting of blades 50), which simultaneously (but individually and cyclically as well as in unison in response to torque of the engine on the respective mounting and rotating shaft 12) have a torque exerted around the respective pivotal axes of said blade roots 111 (having almost cantilever mounting on the outer annular hub member 113) by the rotationally forward pressure of the respective coiled compression springs 143 (as a result of the force exerted by the forward tip of each said rotating spring 143 on its mounting pressure lug 147 at a point suitably spaced slightly below said pivotal axis of the blade root to which it is fixedly attached) said torque on the blade root 111 of each blade 50 being sufficient (at every point around the rotational orbit of said blade 50 around its mounting shaft 12) to displace the trailing edge of the blade 50 from its drag-trailing posture (with respect to the axis of blade root 111 in the outer annular hub member 113 of whatever nature having substanitally fixed conformation as described) in the surrounding air (regardless of cross currents such as those due to rapid forward translational flight of the craft) just enough to match the rotation torque of the engine on the repective shafts 12, whether that engine be operating at full capacity, only partial capacity, or not operating at all.

In this same connection it will be noted particularly that, since the springs 143 operate to control pitch of the blades 50 individually (by virtue of the resilient expansion and contraction of those springs 143 independently as well as in conjunction in response to torque on the respective mounting shafts 12) and without any necessity for momentary delay incident to any otherwise required rotational movement of outer annular hub member 113 with respect to its respective mounting shaft 12 (within the fixed limits of rotation suitably provided by stops 40 in arcuate marginal slots 137 of spool flange 134) blades 50 will have their angles of attack adjusted immediately (cyclically and individually as well as collectively) to correspond with whatever amount of torque is exerted on mounting shafts 12 by the engine, whether variations in the power of the engine is at the election of the pilot for the purpose of inducing descension of the aircraft or because of diminution or complete failure of the power of the engine (even without the knowledge of the pilot flying at low altitudes, when otherwise slowing of rotational speed of blades of the sustaining rotor on any kind of aircraft below their critical tip speed would cause stalling of the air over the airfoils and the resultant crash of the aircraft having inadequate sustaining means). For emphasis, note again that the instantaneous pivotal response of blade roots 111 (for change of pitch of their respective blades 50) to torque exerted thereon by their respective coiled compression springs 143 acting individually under partial compression on their respective off-center mounted lugs 147 fixedly attached to said blade roots 111 brings about the necessary immediate change of pitch of those blades 50 (cyclically in both advancing and retreating phases of their orbits, when stalling might occur otherwise, as well as in unison) to sustain the craft and keep it from falling abruptly under all circumstances (without any worry by the pilot) and to afford just the right amount of angle of attack (individually and cyclically as well as in unison) for each of the blades 50 at all times for most effective lift of those blades 50 commensurate with the power being exerted by the engine, at the election of the pilot or otherwise and even without his knowledge or need for adjustment of the angles of attack by a pilot, who need not know anything about the required rotational speeds of blades 50, and who can therefore operate the craft with complete safety, even though he may never have been off the ground previously, if he is a sensible person knowing how to operate an automobile.

Under any circumstances the resiliently flexible annular connecting hub members 128, 129 universally mounting the upper tips of respective shafts 12 of the paired side-by-side mounted rotors S and S' indicated in FIGS. 1 and 4 in the outer annular hub members 113, having substantially fixed conformation and respectively providing almost cantilever mounting therein of the three blades 50 of each said rotor, have sufficient stiffness therein to impart to those parallel upright shafts 12 (without any appreciable vibrational transfer handicap) the gyroscopic stabilizing tendencies of those blades 50 having considerable collective mass, which are short enough to afford (without tip speeds breaking the sound barrier) sufficient rotational speeds to give primary lateral stability to such a small "family size" aircraft, in which, however, the compact space fuselage 1 is more than long enough to accommodate hospital "stretchers" seven feet in length. And, since it is contemplated that the smaller auxiliary tail rotor P having two blades 6 (as shown in FIGS. 1 and 3 and as described in detail in my copending application No. 688,318 with respect to FIGS. 4 and 5 thereof) will control longitudinal tilt of fuselage 1 with respect to the horizon (and thereby determine the variations from vertical of said paired parallel mounting shafts 12 rotatably mounted in the outrigger frameworks suitably attached to the fuselage between them to determine at the election of the pilot whether the craft will move forward or rearward or hover or move verically as a result of the horizontal component vector component forces of those sustaining rotors S, S' primarily but in conjunction with the tail rotor P) it is necessary that the necessarily light outrigger frameworks rotatably mounting those rotor-mounting shafts 12 have great strength (particularly in the plane containing the axes of rotor mounting shafts 12) to cancel out the lateral precessional tendencies on said paired right and left shafts 12 by the gyroscopic action of those almost but not quite rigid rotors S and S', when the blades 6 of tail rotor P tilt fuselage 1 longitudinally with respect to the horizon in response to the pilot's control of pitch of said blades 6 for the above and other purposes by means explained in detail in my simultaneously filed Application 562,939, of which the present application should be considered only one part.

Since it also is desirable that the resistance to downdraft of air from blades 50 on those outrigger frameworks rotatably mounting side-by-side disposed shafts 12 of rotors S and S' be almost minimum for the weight thereof to afford favorable net lift by those said rotors as well as by the tail rotor P, it will be noted in attached FIGS. 1 and 4 of the several applications that the primary segments of those outrigger frameworks mounting shafts 12 adjacent the outer tips of said frameworks employ in workable cooperative conjunction the following: aligned tubular housings 19 of drive-shafts 18 disposed perpendicural to a vertical plane including the longitudinal axis of the generally cylindrical fuselage 1, from whose sidewalls the said tubular housings 19 emerge at points adjacent the edges of the laterally arched roof of said fuselage and extend outward laterally therefrom sufficient equal distances to mount fixedly on their respective expanded outer tips 70 (inclosing tapered roller bearings in which horizontal drive-shafts 18 are mounted) suitable substantially closed outside gear-boxes 15, to whose upper faces are fixedly attached the respective lower expanded tips 71 of tubular housings 13 in which are mounted (in opposed tapered roller bearings 14, 14' at the upper and lower expanded tips thereof respectively) the two paired at least almost parallel shafts 12 spaced from each other and the fuselage 1 midway between them sufficiently to accommodate blades 50 of suitable length (for the load to be carried) having orbital paths extending at least approximately to the vertical plane containing the longitudinal axis of the fuselage but not extending substantially beyond the opposite sides of the laterally arched fuselage roof at the vertical lateral plane including the axes of said rotor-mounting shafts 12 and passing through the midsection of the generally almost cylindrical fuselage 1 approximately midway between the two hemispherical front and rear end-wall tips of that fuselage having approximately the same diameter as the generally cylindrical fuselage at planes of attachment thereto; vertically bisected cylindrical mounting sleeves 72 having paired vertical flanges bolted together rigidly around the respective upright tubular housings 13 in the upper halves of said housings 13; means keeping the axes of rotor-mounting shafts 12 in planes parallel to the vertical plane including the longitudinal axis of the generally cylindrical (normally generally horizontally disposed) fuselage 1 consisting of symmetrically and diagonally disposed angle-bracing members 69', whose upper tips respectively are attached rigidly to the respective right and left inner segments of said vertically bisected cylindrical mounting sleeves 72, and whose respective lower tips are attached at least almost rigidly to the horizontal lateral tubular housings 19 at points intermediate the tips thereof at which there also are attached to those said tubular housings 19 respectively and to the lower tips of the aforesaid angle-bracing members 69' a second pair of symmetrically disposed tubular angle-bracing truss members 69, which are approximately in alignment with the respective right and left angle-bracing members 69' at almost 45 degree angles between vertical and horizontal, the lower tips of said angle-bracing members 69 being fixedly attached to parallel segments of tubular landing frame members 11' longitudinally disposed with respect to the fuselage at least almost fixedly mounted above those two parallel segments of tubular landing frame members 11' spaced apart by the approximate maximum width of the fuselage and joined together fixedly by multiple laterally disposed members 9' suitably spaced from each other and suitably spaced below the fuselage 1 by two inverted U-shaped tubular frames 11 (vertically disposed adjacent the upright planes at which the hemispherical end-walls join the generally cylindrical intermediate setcions of that fuselage), whose upper curved midsections conform to the interior face of the roof of the generally cylindrical fuselage 1, and whose lower tips (suitably spaced beneath the sidewalls of the fuselage) are fixedly attached to the two parallel midsections of the longitudinally disposed landing frame members. The inversely corresponding right and left diagonally disposed truss members 69, which respectively are attached fixedly at their upper tips to the right and left horizontally disposed tubular housings 19 intermediate the tips thereof and to the lower tips of the respectively aligned angle-bracing members 69', are the primary frameworks whereby the respective right and left rotors S and S' lift the fuselage 1 by means of the parallel segments of longitudinally disposed landing frame members 11', to which FIG. 4 indicates the lower tips of truss members 69 may be welded, but which alternatively are attached fixedly thereto by easily demountable means employing strap clevises (not shown) mounted around the parallel midsectional segments of the landing frame members 11' respectively and having their respective upper tips attached fixedly to the lower tips of truss member segments 69 provided with correspondingly multiple holes therein perpendicular to the longitudinal axes thereof for attachment of said clevises.

Detail FIG. 17 at much larger scale than small scale FIGS. 1, 3 and 4, illustrates a suitable means 19–69–69' fixedly joining respectively the tips of aligned diagonally disposed bracing members 69 and 69' to each other and to the respective horizontally disposed lateral tubular housing 19 intermediate the tips thereof but not quite at its midpoint. Another inversely corresponding bisected tubular clamping member 19–69–69' (not shown, but exactly inversely corresponding to the clamping member having its segments bolted around the framework member 19 as shown in FIG. 17) is attached to the corresponding outrigger framework members 19, 69, 69' on the other side of the fuselage 1. Note in FIG. 17 that multiple horizontally disposed bolts (having hexagonal heads) inserted through holes in the vertically disposed flanges of semicylindrical halves of the combined clamping member 19–69–69' hold the two halves thereof fixedly against the tubular members joined together thereby and that other bolts are inserted horizontally through the tips of aligned tubular truss members 69 and 69'; but it is intended that the opposite half of this fixedly joining means 19–69–69' (not visible in FIG. 17) will be welded rigidly to the tips of tubular bracing truss members 69, 69', since such welding makes the juncture of those parts more rigid and still would permit removal quite easily from the respective horizontal lateral tubular housing 19, relative to which the joining member 19–69–69' cannot move after installation thereon because of means consisting of stud bolt set screws inserted therein as indicated. Detail FIG. 16 illustrates that corresponding (right and left installed) stud bolt setscrews 72', whose tips are inserted in thread tapped holes in the bisected cylindrical mounting sleeves 72 and in corresponding holes in the upright tubular housings 13 (not shown in that figure) of rotor-mounting shafts 12 will keep the bolt joined segments of the two vertically bisected mounting sleeves 72 from moving with respect to the respectively telescoped said tubular housings 13, which are of quite considerable length to provide suitable spacing of the hubs 110 of rotors S and S' mounting blades 50 above the laterally arched roof of the fuselage 1 with proper allowance for slight universal oscillation on respective mounting shafts 12 of outer annular hub members 113 of said hubs 110 and their suitable slightly flexible blades 50 having at least almost cantilever mounting in those hub members 113.

That considerable length of almost vertical tubular housings 13 of rotor-mounting shafts 12 enables the rather widely spaced bearings 14, 14' in the upper and lower expanded tips of housings 13 to absorb the stresses imposed by rapidly rotating blades 50 of rotors S and S' exerting great gyroscopic stabilizing forces (on rotatably mounting respective outrigger frameworks) which thereby tending to stabilize the craft laterally but make it yield quite easily to the longitudinal tilting of fuselage 1 (at the election of the pilot) relative to the horizon by vertical thrust force exerted by airfoil blades 6 of the tail rotor P, whose blade pitch is variable and also reversible at the election of the pilot having tilt-sensitive hydraulic means at his disposal, as explained in detail in my simultaneously filed application No. 562,939 of June 29, 1939 as well as in application 688,318 filed as of Oct. 4, 1957. Note that the upper tip of the angle-bracing tubular member 69' shown in FIG. 16 is welded rigidly to the inner half of the bolt-jointed vertically bisected mounting sleeve 72, both of which in FIG. 4 are shown attached fixedly around the tubular sleeve 13, just as in FIG. 11 one of the cylindrical mounting sleeves 72 is shown mounted around tubular housing 13 immediately below its expanded upper tip, in which is mounted the upper tapered roller bearing 14. Such location of the bisected cylindrical mounting sleeves 72 adjacent the expanded upper tips of tubular housings 13 is made possible by the fact that rotors S and S' are completely self-controlling (as to pitch of their blades 50 in response to amount of torque on rotationally interconnected shafts 12 and otherwise) with no need for mounting pitch-controlling means outside the said tubular housings 13 mounted in the outrigger frameworks at considerable distances from the fuselage and no alternative occasion to insert through a tubular rotor mounting shaft a rod for adjusting pitch of blades 50 through the gear-box 15 with resultant problems of leakage of lubricant etc.

Figure 9:
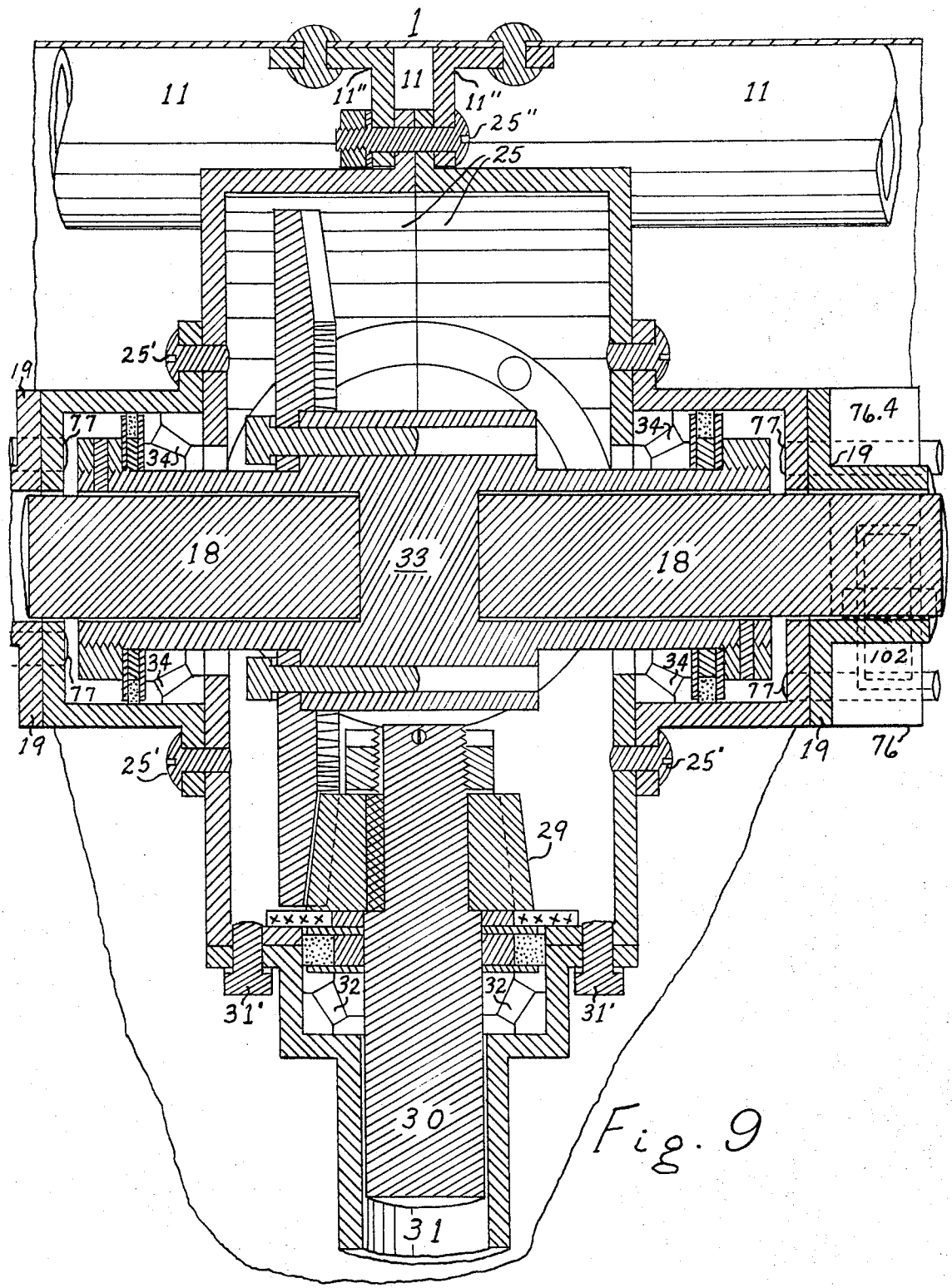
FIG. 9 is a detail vertical cross section at right angles to FIG. 8, through the axes of horizontal and vertical drive-shafts of the rotors.

It is necessary at the same time, however, to have quite strong but light means of keeping the axes of tubular housings 13 (mounting shafts 12 of rotors S and S' having blades 50 of considerable length and mass rotating at high blade tip speeds) from tilting longitudinally in planes substantially parallel to the vertical plane including the longitudinal axis of fuselage 1. Note in FIG. 4 (as well as in detail FIG. 9) that the inner tips of segmented tubular housings 19 having vertical annular flanges are fixedly bolted to the sidewalls of central gear-box 25, which in turn is fixed within the fuselage at the approximate center thereof but adjacent the roof, to which it is fixedly attached. And FIG. 4 indicates also that the inside and outside segments of those tubular housings 19 (inside and outside the walls of the fuselage) are bolted fixedly by means of vertical annular flanges to the sidewalls of fuselage 1 adjacent the edges of the laterally arched roof thereof. But more is needed to stabilize the tubular housings 13 mounting rotor shafts 12 of rotors S and S' with respect to the fuselage 1 without adding great weight to the outrigger frameworks. FIG. 1 indicates that paired forward and rearward tubular bracing frames 10 and 10' (whose upper tips respectively are attached fixedly to the bisected cylindrical mounting sleeves 72 as indicated in FIGS. 4 and 16) respectively are disposed symmetrically and diagonally at angles of 30 degrees from the vertical plane including the axes of shafts 12 in tubular housings 13 and have their inner flanged tips attached by multiple nuts to fuselage 1 (at approximately the same level as that at which the tubular housings 19 emerge from the sides thereof) and to its interior frame members 11 by suitable U-bolts looped around those tubular frame members 11, which are located approximately at the respective front and rear planes at which the substantially hemispherical tips of the fuselage 1 join its intermediate generally cylindrical sections. The foregoing symmetrically disposed diagonal braces 10 and 10', all four of which are fixedly attached to the respective right and left flanged bisected cylindrical mounting sleeves 72 (as indicated in FIGS. 4, 11, 16) adjacent the upper tips of tubular housings 13, effectively keep those housings 13 and their respective rotatably inclosed rotor-mounting shafts 12 from tilting longitudinally of the aircraft around the axis of aligned lateral horizontal tubular housings 19, because the upper tips of those housings 13 substantially fixed in the cylindrical mounting sleeves 72 are thus fixed with respect to fuselage 1 by the symmetrically and diagonally disposed tubular bracing members 10 and 10' of the outrigger frameworks in conjunction with their angle-bracing members 69' attached fixedly to those tubular housings 19 intermediate the respective tips thereof, while the lower tips of tubular housings 13 of considerable suitable moderate length have their respective positions fixed with respect to fuselage 1 by means of the right and left gear-boxes 15 fixedly attached to the expanded lower tips 71 of respective upright tubular housings 13 and also to the outer tips of horizontal tubular housings 19, whose extensions laterally outward beyond their places of substantially rigid attachment to the diagonally disposed truss members 69, 69' (under tension in flight and serving to sustain weight of the rotors S and S' on landing of the craft) are sufficiently stiff to make the mountings of gear-boxes 15 at least almost as parts of the necessarily very light outrigger frameworks. The foregoing construction of the said outrigger frameworks (with gear-boxes 15 respectively fixedly mounted on the free tips of tubular housings 13 and 19) also makes it most easy to install in and remove from said gear-boxes 15 (through conventional inspection plates, not shown, in the diagonally disposed lower faces of said gear-boxes 15) small pinion bevel gears 17, mounted fixedly on the laterally outer tips (within the respective gear-boxes 15) of horizontally disposed lateral drive-shafts 18, and larger rotational speed-reducing bevel gears 16, mounted fixedly on the lower tips of respective rotor-mounting shafts 12, whose teeth intermesh with those of the corresponding bevel gears 17 and thereby rotationally interconnect said shafts 12 with the respective drive-shafts 18 disposed at right angles thereto (thus making it possible to employ such speed reducing bevel gears 16, 17 already manufactured at low cost for other purposes in mass production in the automobile industry).

Figure 8:
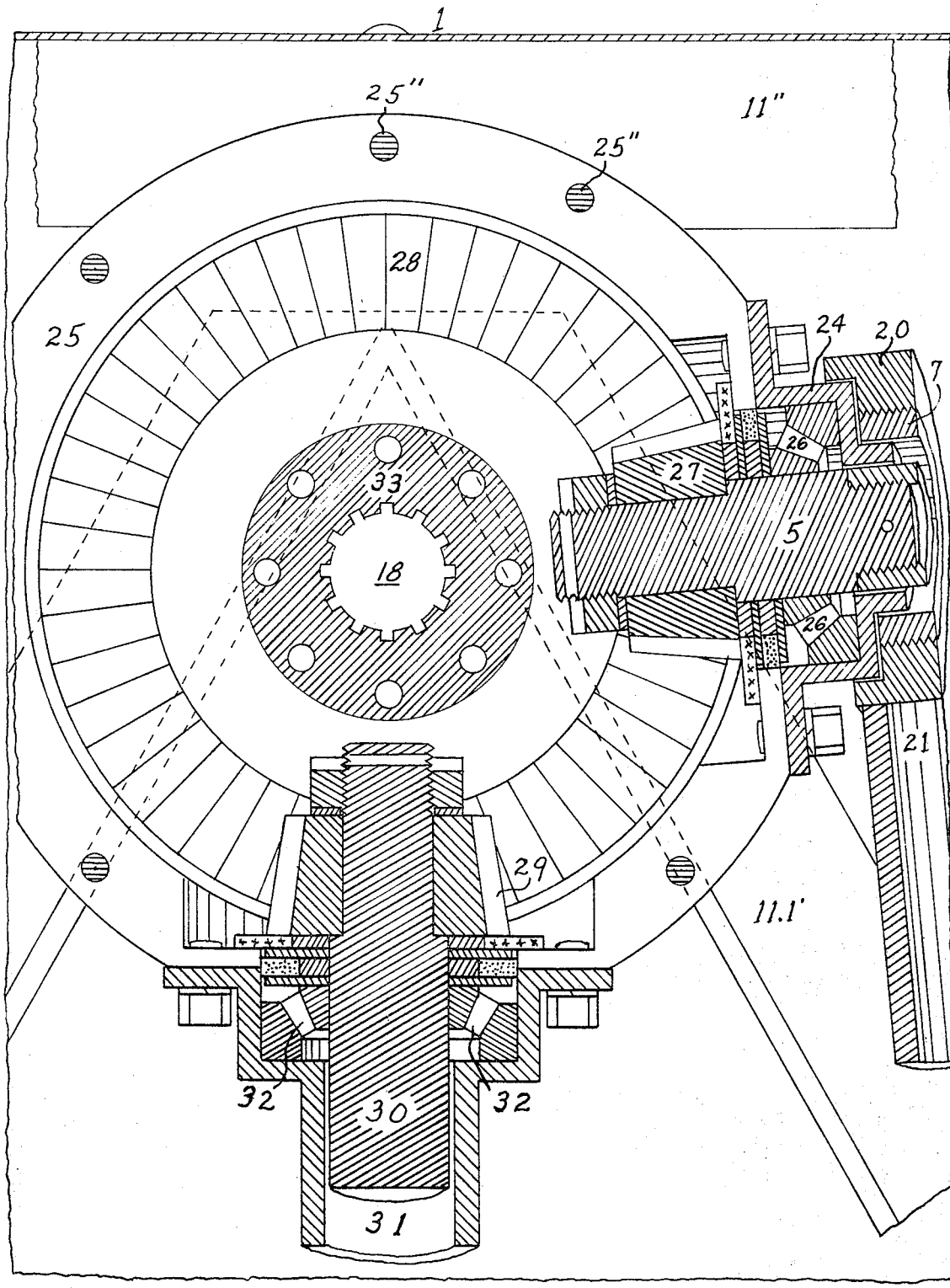
FIG. 8 is a fragmentary detail vertical cross section through the axes of drive-shafts indicated in FIGS. 3 and 5.

In FIG. 6 (as well as in detail FIGS. 8 and 9) it can be seen that the adjacent inner tips of aligned horizontal lateral drive-shafts 18 are axially splined and are inserted in horizontally disposed inverse right and left generally cylindrical cavities in a central generally cylindrical retainer member 33 (having corresponding grooves in the walls of said cavities for receiving said rotationally driving axial splines slidably and with some intervening play, in order to avoid vibrational "slapping" of shafts 18, if the axes of anti-friction bearings in which those shafts 18 are mounted in tubular housings 19 are not kept perfectly aligned), which is rotatably mounted in the central substantially closed gear-box 25 fixedly attached to the interior framework of the fuselage adjacent the roof thereof, and which thus rotatably mounts the adjacent inner tips of rotationally interconnected shafts 18, which normally are rotated during engine-powered flight by large rotational speed-reducing ring-gear 28, fixedly and substantially rigidly mounted on central rotatable retainer 33 (by suitable bolts and annular shoulders as illustrated) and usually driven (in whole or in part by the engine) by its teeth meshing with those of a smaller bevel pinion gear 29 fixedly mounted on the tip of shaft 30 (rotatable in bearings 32 in the expanded upper tip of tubular housing 31 fixedly bolted to the face of vertically bisected gear-box 25, whose two halves are joined together fixedly by multiple bolts 25'', some of which attach the gear-box 25 to interior frame members 11'' of the fuselage, as illustrated in FIG. 8) rotationally interconnected with the drive-shaft of the engine E through a conventional manually operated clutch C and a conventional over-running clutch O (transmitting power in only one rotational direction), which are well known instruments of the art and per se are not considered as being invented by the applicant inventor. It may be recognized from FIGS. 4, 8, and 9 that, since the tips of axially splined shafts 18 respectively are loosely fitted in the corresponding axially disposed grooves in retainer 33 of ring-gear 28, those shafts 18 and the bevel pinion gears 17 mounted on the outer tips of said shafts 18 in respective right and left gear-boxes 15 are operable with quite limited displacement tolerances with respect to corresponding bevel gears 16 mounted fixedly on respective upright shafts 12, even though housings 19 inadvertently ever are not kept perfectly aligned as a result of being alternatively made rotatable with respect to central gear-box 25 and fuselage 1 (for the purpose of making rotor-mounting shafts 12 in tubular housings 13 forwardly tiltable in suitable outrigger frameworks with respect to the fuselage 1), although such an alternative rotational mounting of housings 19 is not to be considered a part of the embodiment of the invention in the present application.

It may be noted also from FIG. 8 that aligned shafts 18 are rotationally interconnected with shaft 5 which in flight continually rotates blades 6 of the tail rotor P at almost but not quite constant rotational speed in flight by virtue of the intermeshing of teeth of bevel ring-gear 28 in central gear-box 25 with teeth of smaller pinion gear 27 fixedly mounted on the forward tip of not quite horizontally disposed drive-shaft 5 of auxiliary tail rotor P, which is pivotally mounted by virtue of fixed attachment of gear-box 4 of that tail rotor assembly (FIGS. 1 and 3) to the rear tip of longitudinally rearward protruding tubular housing 7 freely oscillatable pivotally through 180 degrees around tubular housing 24 (FIG. 8), whose expanded forward tip (mounting therein tapered roller anti-friction bearing assembly 26 mounting the forward tip of drive-shaft 5) is bolted fixedly to the rear face of central gear-box 25, which thus additionally is kept from rotating with respect to the fuselage 1, thereby in turn also making more fixedly stable the outrigger frameworks, of which the primary members are the relatively short and thus strong horizontal lateral tubular segmented housings 19, which are bolted fixedly to the central gear-box 25 as well as to the side-walls of the fuselage 1 (in the present embodiment of the invention), from which the four respective segments of those tubular housings 19 of drive-shafts 18 protrude laterally.

FIG. 3 shows at larger scale from the side of the same aircraft shown in FIGS. 1 and 4 the symmetrical diagonal disposition of outrigger framework bracing members 10 and 10' with respect to fuselage 1 and its mostly interior framework members 11, to which the lower forward and rearward tips of those braces 10 and 10' respectively are attached at almost the same height as are bolted the lateral horizontal segmented tubular housings 19, on whose respective expanded outer tips are fixedly attached the two right and left gear-boxes 15, one of which can be seen in FIG. 3. At a suitable distance (determined primarily by necessary clearance between outer tips of rotating blades 50 and the laterally arched roof of generally cylindrical fuselage 1, as previously explained) above the respective substantially closed gear-boxes 15, to which annular flanges of the expanded lower tips 71 of tubular housings 13 are fixedly bolted, are mounted fixedly substantially around said tubular housings 13 on the upper halves thereof respective right and left vertically bisected mounting sleeves 72, one of which is illustrated in adjacent detail FIG. 16 at larger scale, as explained previously herein. All four of the bracing members 10 and 10' have rigidly attached to their respective outer and upper tips a corresponding vertically disposed flange; and in larger scale detail FIG. 16 the said vertically disposed flange tip of bracing member 10' is shown fixedly attached to the upper outer tip (shown fragmentarily) of the rearwardly disposed tubular bracing member 10', the perforated flanged tip of that bracing member 10' being inserted between the two corresponding rear vertically disposed inverse flanges of the respective inner and outer halves of the bisected cylindrical mounting sleeve 72, whose said halves are rigidly joined to each other and to the intermediate vertical flanges 10' by the four corresponding bolts illustrated by the two such bolts shown by broken lines in FIG. 16, and which are held in suitable position on tubular housing 13 by means of the stud bolt setscrew 72' inserted, as explained previously herein, in corresponding thread-tapped holes in said sleeve 72 and in its inclosed tubular housing 13 (not shown in detail FIG. 16, but to be seen in smaller scale FIG. 3).

FIG. 3 also shows (in conjunction with FIG. 1) suitable disposition of symmetrical diagonally disposed light tubular bracing members 8" and 8' mounting the rear tip of tubular bracket 8 (protruding rearward and at least not quite horizontally from the fuselage 1) in which fixed tubular bracket 8 is pivotally oscillatable tubular housing 7 mounting rear gear-box 4 (fixedly attached to the rear end thereof) and thereby the auxiliary steering and fuselage-tilt control rotor P; but the features of the pivotal mounting and steering operation of that auxiliary rotor assembly P, whose blades 6 have their pitch controlled by tilt-sensitive hydraulic means operating in conjunction with the manual control of the pilot are explained in detail in a separate application Ser. No. 562,939 filed simultaneously herewith as of June 29, 1966 (and in conjunction with my restricted copending application No. 688,318) showing operation and construction of such a pivotally mounted rotor assembly P not only with a craft having two main sustaining rotors mounted side-by-side as indicated in FIG. 1 but also with a craft having more than two paired side-by-side mounted main sustaining rotors as indicated by the four such rotor hubs in FIG. 2.

In FIG. 4 and in larger scale detail FIG. 8 it is indicated that gear-box 25 (and the attached laterally and horizontally disposed tubular housings 19 and outside gear boxes 15 aligned therewith horizontally) is mounted fixedly adjacent the laterally arched roof of fuselage 1, in order to remove all those attached members from conflict with the heads of passengers insofar as possible in a generally cylindrical at least almost horizontally disposed fuselage of only moderate height for a "family size" aircraft. It is obvious from FIG. 3, however, that rotors S and S' having blades 50 of only moderate length for such an aircraft alternatively may be mounted somewhat lower with respect to fuselage 1 than is shown in that figure simply by shortening tubular housings 13 mounted on top of gear-boxes 15, in which event the inner and lower tips of symmetrically forwardly and rearwardly disposed diagonal braces 10 and 10' (fixedly attached to the fuselage on each side thereof in the upper halves thereof), whose upper and outer tips are attached to the respective right and left mounting sleeves 72, alternatively may be lowered slightly below the level of lateral tubular housings 19 mounting outside gear boxes 15 as illustrated in FIG. 3. And, while it is substantially necessary that sleeves 72 be attached to respective tubular housings 13 around the upper halves thereof, in order to insure freedom of the outrigger frameworks from vibration and other strains by rather large rotors S and S' turning at suitable speeds without blade tip speeds in excess of the speed of sound, it is not necessary that those sleeves 72 be attached to tubular housings 13 immediately adjacent the expanded upper tips 73 of those suitably long housings 13 in which bearings 14 are mounted in the expanded upper and lower tips thereof.

In the diagrammatic drawings attached hereto the lateral horizontal tubular housings 19 of drive-shafts 18 are indicated as being cylindrical, since that is the construction affording maximum strength for least weight; but alternatively those housings 19 themselves may be enclosed in turn in light vanes making them streamlined with respect to the downdraft of air from blades 50 rotating in opposite directions as indicated by curved arrows in FIG. 1. In this same connection outer surfaces of said streamlining light vanes mountable on said housings 19 alternatively may be varied with respect to each other just sufficiently that the downdraft of air from blades 50 passing over them in normal flight will exert a torque horizontally around the vertical axis of the aircraft just sufficient to cancel and offset the very slight torque exerted on fuselage 1 by the upright shaft 2 mounting blades 6 of the small auxiliary tail rotor assembly P, which blades 6 are rotated continually in flight at almost but not exactly constant speed, whether the craft is sustained by suitable power of engine E or whether blades 50 of the side-by-side mounted rotors S, S' are turned by aerodynamic autorotation in case of diminished power, elected by the pilot or otherwise.

In FIGS. 1, 3, and 4 the diagonal braces 10 and 10' are all disposed symmetrically with respect to the vertical and horizontal planes including the longitudinal axis of generally cylindrical fuselage 1 as well as with respect to the plane perpendicular to that axis and including the longitudinal axes of cylindrical housings 13 and 19 at least as shown in the several drawings. It is necessary that the bracing members 10 and 10' on one side of fuselage 1 be substantially inverse to the corresponding bracing members on the opposite side of the fuselage as to construction and as to diagonal disposition; but the bracing members 10 disposed forwardly of the vertical plane including the axis of substantially aligned housings 19 and the axes of cylindrical housings 13 may be somewhat different as to both said diagonal disposition and configuration from the diagonal members 10' disposed rearwardly of that plane, which of course includes the axes of cylindrical mounting sleeves 72 to which all four of the diagonally disposed bracing members 10, 10' are attached at their upper outer tips, as explained previously.

In FIGS. 1 and 3 it can be seen in connection with the foregoing description of the disposition of bracing members 10 and 10' that forwardly disposed bracing members 10 actually are long narrow fixed stabilizing wings (perhaps more appropriately called "stabilizing vanes") each respectively having mounted longitudinally therethrough slightly conical but almost cylindrical spars 10", which are tubular but have sufficient strength to maintain positions of those airfoils only because their lower forward tips are attached fixedly to the sidewalls of the fuselage 1 (in the upper halves thereof and approximately at the plane at which the hemispherical front wall-tips of that fuselage are joined to the generally cylindrical intermediate sections of that fuselage, in which inverted U-shaped tubular interior frames 11 are mounted), while the outer upper and rearward tips thereof are attached fixedly to the vertically bisected cylindrical mounting sleeves 72 respectively fixedly attached to the upper halves of upright tubular housings 13 of the respective outrigger frameworks, which thereby keep spars 10" under tension. Airfoil vanes 10, which have their inner forward lower roots fixedly attached simultaneously to the respective fuselage sidewalls and to the interior frame member 11 thereof, have small airfoil chords that gradually diminish from points of attachment to the fuselage toward their outer upper rear tips, which are joined fixedly to the respective right and left said mounting sleeves 72 as explained previously. As indicated in FIG. 3 the leading edges of those airfoil vanes 10 are slightly higher than their trailing edges, with the angles of attack of the respective airfoils 10 gradually increasing slightly toward the more narrow outer upper rear tips thereof, so that the two very slender tensional airfoil vanes 10 almost are streamlined with respect to the normal downdraft of air in at least moderate forward translational speed flight of around two hundred miles per hour.

FIG. 1 shows narrow airfoils 10 with a backsweep of about 30 degrees from the plane at which the hemispherical endwall tip of the fuselage 1 is joined thereto perpendicular to the longitudinal axis of the said generally cylindrical fuselage. And, since bracing members 10 and 10' are shown in FIG. 3 as symmetrically disposed, it follows that airfoils 10 attached to the front tip of fuselage 1, are disposed diagonally at angles (with respect to the horizontal plane including the longitudinal axis of aligned lateral housings 19 as well as with respect to the vertical plane including the longitudinal axis of fuselage 1) from the horizon corresponding to the disposition angles of rearwardly disposed diagonal tubular bracing members 10' shown in FIG. 6. Thus fixed wing airfoils 10 have a satisfactorily sharp dihedral angle (somewhat more than 60 degrees) with respect to the vertical plane including the longitudinal axis of the fuselage 1 and likewise are backswept at angles almost twice as great as the divergence from the horizon, so that these small airfoil vanes 10 have a very necessary stabilizing effect on the front tip of fuselage 1 in case of power failure at high forward translational speeds in excess of 200 miles per hour (of which my aircraft is capable because of its various characteristics), even though the lift of airfoils 10 is not great at such times, when the flow of air below blades 50 of side-by-side mounted rotors S and S' suddenly may become upward with respect to the aircraft rather than downward as in ordinary circumstances of engine-powered flight. And such stabilizing effect of airfoils 10 disposed as shown in the drawings is accomplished by them even though those same small airfoils 10 are substantially streamlined in the normal downflow of air from blades 50 under power of the engine, because the downdraft of air from those blades 50 tends to be rotated inwardly toward fuselage 1 beneath the radically backswept and upswept slender fixed wing airfoils 10 (otherwise forming necessary diagonally disposed braces of the outrigger frameworks mounting rotor shafts 12), because those bracing airfoils 10 having respective spars 10 therethrough (under tension, and therefore of light construction) are disposed radially (from the axes of shafts 12 respectively) beneath the blades 50 mounted on said rotor mounting shafts 12 (as indicated in FIG. 1) at angles of about 60 degrees from the vertical plane including the longitudinal axis of fuselage 1.

In top plan view FIG. 1 the arcuate appearing sidewalls 1' of the horizontally disposed and generally cylindrical fuselage 1 illustrate that the sidewalls thereof are gradualy drawn inwardly toward the midsection thereof from the generally cylindrical sections thereof adjacent the vertical planes at which respectively the hemispherical endwalls of similar diameter are joined to said intermediate generally cylindrical sections. And FIG. 4, showing a vertical lateral cross section at larger scale of the same said midsection of the fuselage 1 at the plane including the axes of mounting shafts 12 of rotors S and S' as well as the axis of lateral tubular housings 19 of driveshaft 18, shows that the sidewalls 1' gradually are drawn in more toward the edges of the laterally arched roof of the fuselage 1 than adjacent its floor, at which the engine E may be installed immediately below that floor as indicated in FIG. 4 or alternatively of course may be located imediately on top of that floor as desired for use of an aircraft operating principally over land or over both land and water. The purpose of the above described restrictions of the fuselage sidewalls 1, toward the fuselage midsection is to reduce resistance of fuselage 1 to the rotary downdraft of air from blades 50 everywhere on the roof of the fuselage except on those sections of said roof against which air is driven downwardly and inwardly toward the vertical plane including the longitudinal axis of the fuselage by those sections of blades 50 adjacent their outer tips (the length of said sections of blades 50 respectively depending on whether the orbits of blades 50 are made to extend only approximately to the vertical plane including the longitudinal axis of the fuselage or alternatively may be made to extend approximately across the roof thereof at the vertical plane including the axis of lateral tubular housings 19), since it is only the air driven downward by those outer tip sections of blades 50 adjacent their outer tips that is deflected upwardly across the laterally arched roof of the fuselage against the lower sides of the blades 50 of the other rotor on the opposite side of the fuselage to give the latter said blades 50 additional lift during the retreating phases of their orbits in rapid forward translational flight of the aircraft. And note again from lateral cross section FIG. 4 in conjunction with top plan view of FIG. 1 that the distance between the rearwardly rotating tips of blades 50 and the laterally arched roof is gradually reduced (whether the lateral cross section of that roof be an arc corresponding in radius to the radius of the generally cylindrical fuselage as shown in FIG. 4 or alternatively may be made as a rather flat gable having an angular crest at the vertical plane including the longitudinal axis of the generally cylindrical fuselage) as those blade tips travel inwardly and rearwardly toward the crest of the fuselage at the vertical plane containing the longitudinal axis of fuselage 1.

In FIG. 3 it is indicated that the crest of fuselage 1 is parallel to the longitudinal axis of that generally cylindrical fuselage; but it will be appreciated that the roof of that fuselage also alternatively may have its midsectional crest slope upward slightly toward the rear thereof and that the axes of rotor shafts 12 do not have to be exactly perpendicular to the horizontal plane including the longitudinal axis of that fuselage, since a slight forward tilting of rotor-mounting shafts 12 relative to the axis of the fuselage 1 alternatively would reduce air resistance of the thus horizontally disposed fuselage 1 very slightly in very rapid forward flight, although the fuselage 1 shown in FIG. 1 is not presumed to be unduly long. But it will be appreciated also that the longitudinal midsectional crest of the laterally arched roof alternatively may be made to rise slightly toward its rear end with respect to said horizontal plane including the longitudinal axis of the generally cylindrical fuselage 1. Such an aternatively formed crest of the fuselage rising toward the rear is quite convenient for construction, particularly when the cylindrical tubular bracket 8, pivotally mounting rearward protruding tubular housing 7 of driveshaft 5 of the tail rotor P, alternatively may be mounted on top of the midsectional crest of the rear inverted U-shaped tubular interior frame member 11 of the fuselage instead of being suspended below that interior frame member 11 as would be indicated in FIG. 3, in which blades 6 of steering and fuselage-tilt tail control rotor assembly P would exert only slight forward vector force on the fuselage, although that forward vector force of blades 6 exerting some slight lift on hubular housing 7 under normal flight conditions would be increased somewhat, when the fuselage would be tilted forward slightly by tail rotor P to tilt tubular housings 13 mounting rotors S and S' on enclosed shafts 12 to derive principal forward vector force from sustaining rotor blades 50 in forward translational flight.

What I claim and desire to secure by Letters Patent is:
1. A rotary wing aircraft having paired sustaining rotors mounted side-by-side with respect to a fuselage centrally disposed with respect to the upright rotor-mounting shafts, which are rotationally interconnected and are turned by the rotationally interconnected driveshaft (provided with an over-running as well as a manually operable clutch) of an engine mounted in said fuselage, which is generally cylindrical and at least approximately horizontally disposed during hovering of the aircraft and which has generally hemispherical inversely corresponding front and rear end-walls having the same radii as the generally cylindrical fuselage, on each side of which halfway between said hemispherical endwalls are mounted inversely corresponding right and left outrigger frameworks, in which are rotatably mounted the mounting-shafts of said paired sustaining rotors, each of which employs in continued workable cooperative conjunction the following: a spool, rigidly mounted on the upper tip of the rotatable upright mounted shaft, having parallel annular flanges suitably spaced from each other to accommodate between them a pair of resiliently flexible an- nular plates, each of which is made of multiple plies of fabric made of cross woven threads of cotton and nylon between which is impregnated suitable resiliently binding rubber-like binding material, and the inner margins of both of which are rotatable around the cylindrical midsection of said spool between its parallel annular flanges, to the periphery of the lower one of which is rigidly attached a truncated rather flat and slightly conical platform of suitable diameter, which on occasion limits universal oscillation of the resiliently flexible annular plates with respect to the upright mounting shaft and forms a broad base for the lower one of said annular flexible plates of the rotor hub on landing of the aircraft; means limiting rotation of said resiliently flexible annular plates with respect to said spool within a suitable number of degrees; an outer annular hub member, having substantially fixed conformation and its inside diameter somewhat greater than the outside diameter of the parallel flanges of said spool, disposed between and rigidly bolted to the outer peripheral margins of said resiliently flexible annular plates, which thereby serve as a resiliently flexible and suitably stiff means mounting said outer hub on said rotating shaft, so that said outer annular hub member is universally oscillatable within gradually and progressively restricting limits on multiple axes perpendicular to the axis of the mounting shaft, with respect to which the outer annular hub also can move axially within gradually and progressively restricting limits determined by the resiliency of the annular plates, between the outer margins of which is at least almost rigidly attached said outer annular hub member, which is rotated thereby and which provides substantially cantilever but not completely rigid pivotal mounting therein of respective roots of multiple blades (equally spaced from each other around the axis of the mounting shaft around which they all travel in the same orbital path, but with their longitudinal axes not disposed radially therefrom), whose outer tips (in the course of their orbital rotation around their mounting shaft) extend approximately to the vertical plane containing the longitudinal axis of the generally cylindrical fuselage, whose laterally arched and normally almost horizontally disposed roof deflects laterally and upwardly the air driven downward and simultaneously slightly rearward by the tips of said blades of the side-by-side mounted sustaining rotors retreating rearwardly over the adjacent respective halves of said laterally arched roof during forward translational flight, thereby increasing slightly the air pressure over the forward half of said roof of the fuselage but simultaneously increasing the lift of the tips of said blades during their retreating phases of their orbital paths, when the lift of the blades otherwise would be minimum, thereby increasing uniformity of lift of said blades and simultaneously decreasing vibratory strains on said blades, on their respective mounting hubs and bearings, on respective mounting shafts in the outrigger frameworks, and on the passengers in the fuselage.

2. In a rotary wing aircraft, a sustaining rotor mounted on the upper tip of a rotatable shaft rotationally interconnected with the drive-shaft of an engine by means of an over-running clutch as well as by a manually operable clutch and employing in continued workable co-operative conjunction: an inner annular hub member fixedly attached to the upper tip of the rotatable mounting shaft; a second outer annular hub member, whose smallest diameter is suitably greater than the outer diameter of the first said inner annular hub member, around which said second hub member is mounted rotatably within suitable fixed limits of a few degrees at approximately the same level; resilient flexible means connecting the first said annular hub member to the second said annular hub member, which is rotated thereby and which by virtue of the resiliency of the flexible connecting means is movable vertically with respect to the mounting shaft within gradually and progressively restricting limits and simultaneously also is oscillatable universally within gradually and progressively restricting limits with respect to the axis of the mounting shaft on multiple axes perpendicular to said rotational axes of the mounting shaft; an annular platform, attached perpendicularly to the mounting shaft at said line of attachment around said shaft (on which it is non-rotatably and fixedly mounted immediately below the first said inner annular hub member fixedly attached to the upper tip of said mounting shaft), and having a somewhat circular outer edge, in which are cut somewhat triangular gaps equally spaced from each other in the outer margin of the platform, and forming a suitable framework mounting cylindrical spring-mounting fingers adjacent the rear walls of the respective almost right-angle gaps corresponding in number to the number of airfoil blades, whose cylindrical blade roots (attached fixedly to the respective blades at least almost in alignment with the longitudinal axes thereof respectively) have pivotal at least almost cantilever mounting at the same level in the outer annular hub member having substantially fixed conformation (tangentially thereto) spaced only a short distance above the gaps in said peripheral margin of said spring-mounting platform, with respect to which the outer annular hub member is rotatable within fixed limits of several degrees around the axis of the shaft non-rotatably mounting said platform; and resiliently flexible coiled compression springs of suitable length and strength, whose rear tips respectively are mounted (slidably on each of the said short spring-mounting fingers respectively) at equal distances peripherally from each other and from the rotor-mounting shaft in the respective aforesaid gaps in the outer margin of said annular platform, which in engine-powered flight exerts pressure rotationally on the rear tips of said coiled compression springs in unison as a result of torque by the engine on said rotor-mounting shaft, the front end of each such coiled compression spring in turn individually exerting pressure (as a result of said torque of the engine on the mounting shaft) on a corresponding pressure lug (provided with a short cylindrical finger slidably inserted in the rotationally-forward tip of its respective coiled compression spring) fixedly attached off-center to the respective pivotally mounted blade root, which thereby is rotated around the rotor-mounting shaft by said coiled compression spring acting in conjunction with the other such coiled compression springs acting simultaneously on their respective pressure lugs fixedly attached to their respective blade roots (at a suitable small distance in each instance below the axis thereof in the respective pivotal mounting for mounting the respective rotationally forward fingers mounting the forward tips of said coiled compression springs), and which simultaneously has a torque (exerted by the resiliency of said coiled compression spring) around the pivotal longitudinal axis of said cylindrical blade root (as a result of the lower off-center attachment of said pressure lug to said blade root) exactly sufficient to deviate the rotationally trailing edge of the airfoil blade from its neutral position rotationally rearward of the said blade root axis to such extent that the angle of attack of said blade (cyclically and individually as well as in conjunction with the other such blades mounted in the hub at equal distances from each other peripherally) will be just enough positively to make proper employment (at all times and instantaneously) of the rotational torque of the engine on the rotor-mounting shaft, whether that engine be operating at any moment at full power, at somewhat diminished power (at the election of the pilot operating his controls or otherwise and even without his knowledge), or not operating at all for any reason, so that the rotational speed of the blades at all times is as nearly constant as necessary and is at least sufficient to maintain the craft at a slowly descending rate in case of complete power failure, and at other times the rotational speed of the blades is such as to make most efficient use of whatever mount of torque is exerted on the rotor-mounting shaft by the drive-shaft of the engine, at the election of the pilot and otherwise.

3. A rotary wing aircraft having a sustaining rotor employing in satisfactory continued workable cooperative conjunction: multiple airfoil blades, each of which has a cylindrical root substantially fixedly rigidly attached to its inner tip with the longitudinal axis of said blade at least almost in alignment with the longitudinal axis of its cylindrical root mounted pivotally in a bracket almost fixedly mounted on a outer annular hub member having substantially fixed conformation and tangentially thereto at a suitable distance from the rotational axis of said hub member equal to that at which another such blade root is correspondingly mounted in said outer annular hub member; a generally cylindrical inner hub member, whose outside diameter is appreciably less than the inside diameter of the aforesaid outer hub member surrounding at substantially the same level the inner hub member, which is mounted on the upper tip of the rotor-mounting shaft; resiliently flexible means attached to the outer annular hub member and providing suitable flexible mounting of that outer hub member on the inner hub member permitting the outer hub member to move slightly axially with respect to the inner hub member (and with respect to the shaft on which the inner hub member is fixedly mounted) as well as to tilt with respect to the rotational axis of that shaft on an axis perpendicular to said rotational axis and perpendicular to the pivotal axis of each of the blade roots in its respective bracket in said outer annular hub member, which thereby is provided with means gradually and progressively limiting said oscillation of the substantially rigid outer annular hub member on an axis perpendicular to the axis of the rotatable mounting shaft and also gradually and progressively limiting axial movement with respect to the mounting shaft of said outer annular hub member having substantially fixed conformation providing almost completely cantilever pivotal mounting therein of its airfoil blades.

4. A rotary wing aircraft specified in claim 3 in which the said sustaining rotor has more than two blades.

5. A rotary wing aircraft specified in claim 3 in which the rotatable mounting shaft of the rotor has mounted thereon immediately below the inner hub member an almost rigid annular platform framework, at least almost perpendicularly disposed with respect to said mounting shaft and non-rotatable therearound, providing a broader stabilizing base sustaining from beneath it the outer annular hub member, when that hub member settles downward with respect to the rotor-mounting shaft on landing of the craft, and having in its outer margin (beneath the outer annular hub member) suitable substantially rightangle triangular gaps (corresponding in number to the number of the blade roots, each of which is pivotally oscillatable in its respective mounting bracket within suitable fixed limits), at the rotationally-rear wall of each of which is mounted a suitable short cylindrical finger, on which is in turn mounted (slidably and against the rear wall, disposed substantially radially with respect to the axis of the mounting shaft, of said triangular gap in said platform margin) the rotationally-rear tip of a resilient coiled compression spring (of suitable length and strength and suitably disposed in substantial alignment with the axis of the mounting finger), whose forward tip is mounted on an inversely corresponding short second cylindrical finger, which has its rotationally-forward tip rigidly attached to the rotationally-rear face of a pressure lug, against which the rotationally forward face of the coiled compression spring normally presses during engine-powered flight of the aircraft, said pressure lug being fixedly attached to its respective blade root with the longitudinal axis of said second finger (disposed at approximately 90 degree angles with respect to the axis of the attached cylindrical blade root) being located just sufficiently below the said axis of said at least almost fixedly attached blade root (in its pivotal mounting in the outer annular hub member for pitch variation) that the torque exerted by the pressure of the resiliently flexible spring, on the rear end of which pressure is exerted by the aforesaid annular platform framework (in response to torque on the rotor-mounting shaft by the rotationally-interconnected drive-shaft of the engine), is just sufficient to provide an angle of attack of the airfoil blade (individually and cyclically as well as in unison with any other such blade of the rotor similarly acted upon by a corresponding coiled compression spring) with respect to the surrounding air that most effective utilization is made of the power of the engine (either maximum or partial and even complete lack thereof at times) when that power is exerted on the rotor-mounting shaft, around which the mounting means of the outer annular hub member makes its rotatable within fixed rotational limits of several degrees provided by that mounting means, although in normal flight powered by the engine the said outer annular hub (except in the unusual circumstances such as take-off and landing) will be disposed rotationally intermediate those rotational limits as a result of the moderate forward rotational pressure of the combined coiled compression springs on the several blade roots at points spaced from the axis of the rotor mounting shaft, on which the torque of the engine drive-shaft is exerted in varying amounts at different times.

6. A rotary wing aircraft employing in continued workable cooperative conjunction the following: a generally horizontally disposed and generally cylindrical fuselage having generally hemispherical endwall tips of approximately the same diameter as the generally cylindrical intermediate sections of the fuselage to which said hemispherical endwalls are rigidly attached; at least two inverted U-shaped tubular fuselage frame members, one of which is located adjacent the vertical lateral plane at which the hemispherical rear endwall of the fuselage is joined to the generally cylindrical intermediate segment thereof, and another one of which is correspondingly located adjacent the hemispherical front endwall of the fuselage, which, when not in flight, is supported by said inverted U-shaped frame members, whose upright parallel segments extend at least almost vertically through holes in the fuselage wall at points of greatest width thereof and have their lower tips attached fixedly to parallel tubular segments of a generally longitudinally disposed landing framework, suitably spaced below the fuselage, having multiple cross members fixedly spacing from each other said parallel tubular segments of the landing framework, whose rear slightly upward-tilted tips are somewhat farther spaced from each other rearward of the points at which the lower tips of the inverted U-shaped tubular fuselage frame members are fixedly attached to said parallel tubular landing frame segments; mounted on the fuselage an engine whose drive-shaft, provided with a conventional over-running clutch transmitting power in only one rotational direction as well as provided with a conventional manually operable clutch, is in rotational connection with a generally cylindrical retainer mounting a beveled ring-gear and being rotatably mounted in tapered roller bearing opposed assemblies mounted (on an axis perpendicular to the vertical plane including the longitudinal axis of the fuselage) in a central gear-box substantially fixed in the fuselage about midway between the hemispherical tips of the fuselage and adjacent the roof thereof, said ring-gear retainer having bored through it horizontally a suitable cylindrical hole (on the same rotational axis) provided with axially disposed grooves in said generally cylindrical retainer for receiving axially splined inner adjacent tips of a pair of horizontally and laterally disposed drive-shafts, which are inserted through corresponding holes in the sidewalls of the fuselage (adjacent the edges of the laterally at least almost arcuate roof of the fuselage) and through respective right and left tubular housings (having perforated vertical annular flanges integrally attached to the tips thereof) interposed between the correspondingly perforated walls of the fuselage and the sidewalls of said gear-box, to each of which respectively said tubular housings of said substantially aligned driveshafts are rigidly bolted by said perforated flanges thereof, thereby fixedly spacing the fuselage sidewalls from each other and preventing rotation of the said tubular housings with respect thereto while simultaneously maintaining the position of said central gear-box in the fuselage; an inversely corresponding very strong but light right and left outrigger framework mounted on each side of the said fuselage consisting of the following: an outer horizontally disposed lateral tubular drive-shaft housing (substantially aligned with the rotational axis of the said ring-gear retainer in the central gear-box and with the opposed right and left drive-shafts whose adjacent tips having axially disposed splines are suitably mounted therein with sufficient looseness of fit to prevent slapping of said shafts, if said outer horizontally disposed lateral drive-shaft housings are not kept in perfect alignment), whose inner tip (having a vertical annular flange rigidly attached thereto) is fixedly attached to the sidewall of the fuselage, and whose expanded outer tip (containing a suitable radial axial thrust anti-friction bearing assembly) having a perforated vertical annular flange is bolted fixedly to an outside substantially closed gear-box, to whose upper face is rigidly bolted the annular flange (normally substantially horizontally disposed in hovering flight) of the expanded lower tip of an upright tubular housing of quite substantial length having an expanded upper tip in which is mounted an opposing axial thrust radial anti-friction bearing assembly immediately below a suitable airfoil bladed rotor mounted on the upper tip of a shaft suitably mounted through said tubular housing (disposed upright in hovering of the aircraft) in said pair of opposed bearing assemblies; a vertically bisected cylindrical mounting sleeve, whose respective approximate halves have perforated parallel flanges (integrally attached thereto) through whose corresponding holes in said flanges are inserted horizontal bolts, whose nuts on the threaded tips thereof mount the joined bisected sleeve fixedly around the upper half of the upright tubular housing, provided with a hole therein into which extends a threaded stud bolt screwed through a hole in the outer half of said mounting sleeve, to whose opposed inner half is integrally attached the upper tip of a diagonally disposed angle-bracing frame member, whose lower inner tip is fixedly attached to the above-mentioned outer segment of the segmented horizontal lateral tubular housing intermediate the tips of said outer segment and to the upper tip of a substantially aligned diagonally disposed tubular truss frame member situated below said horizontal tubular housing outer segment, to which also is fixedly attached the upper tip of said tubular truss member, whose lower tip is fixedly attached to the adjacent one of the said parallel tubular landing frame members about midway between the points of attachment thereto of the lower tips of the inverted U-shaped fuselage frame members; a rearwardly disposed tubular bracing member (diagonally disposed with respect to vertical and horizontal planes including the longitudinal axis of the fuselage as well as with respect to a vertical plane including the axes of the aforesaid upright tubular housings in which are mounted the rotor-mounting shafts) whose upper outer forward tip is attached fixedly to the aforesaid bisected cylindrical mounting sleeve, and whose inner lower rear tip is fixedly attached to the wall of the fuselage and to its mostly inclosed inverted U-shaped tubular frame member adjacent the plane at which the hemispherical rear tip of the fuselage is joined to the generally cylindrical intermediate section thereof at approximately the same level as the aforesaid horizontal lateral tubular drive-shaft housing; a second forwardly displosed very slightly conical tubular bracing member, whose upper outer rear tip is fixedly attached to the aforesaid vertically bisected cylindrical mounting sleeve, and whose lower inner forward tip is fixedly attached to the wall of the fuselage and its inverted U-shaped interior frame member (adjacent the plane at which the generally hemispherical forward wall-tip of the fuselage is joined to the generally cylindrical intermediate section thereof and at about the same level as the aforesaid horizontal lateral tubular housing of the driveshaft), the aforesaid very slightly conical tubular tensional bracing member being disposed longitudinally through and serving as the spar of a fixed-wing airfoil, whose chord is considerably greater at its inner, lower, and forward point of attachment to the fuselage than at its outer, upper, and rear point of attachment to said cylindrical mounting sleeve somewhat rigidly attached to the upper half of the upright tubular housing of the rotor-mounting shaft, and whose leading edge is suitably higher than the trailing edge of the airfoil at said place of attachment to the fuselage, from which point place of attachment the angle of attack of the airfoil increases gradually toward the outer upper rear tip thereof, said light, long and slender airfoil thus being at least almost streamlined in the downwash of air from the blades of the rotor mounted on the aforesaid rotatable shaft in the outrigger framework but also having some lift on the forward tip of the fuselage in case of quite substantial diminution of power of the engine during rapid forward translational flight, at which time the two paired fixed right and left airfoils under tension serve as small slender stabilizing wings by virtue of their having suitable sharp dihedral angles with respect to the vertical plane including the longitudinal axis of the fuselage and by virtue of their having a pronounced backsweep of their longitudinal axes approximating 30 degrees from the vertical plane perpendicular to said longitudinal axis of the fuselage at the upright plane of juncture of the hemispherical front endwall tip of the fuselage with the generally cylindrical intermediate section thereof; and means rotationally interconnecting the two paired rotor mounting shafts with each other and with the over-running clutch at most times driven by the drive-shaft of the engine and employing (in conjunction with each of the two above specified outrigger frameworks on each side of the fuselage respectively) a large speed-reducing bevel gear, rigidly mounted on the lower tip of the rotor-mounting shaft in its respective outside gear-box, whose teeth intermesh with the teeth of a much smaller bevel gear fixedly mounted in that gear-box on the outer tip of the longer said horizontally disposed drive-shaft, mounted in suitable bearings in the substantially aligned tubular housings and having its axially splined inner tip slidably mounted in the above-described rotatable ring-gear retainer.

7. A rotary wing aircraft employing in continued workable cooperative conjunction: an engine rotating (by means including its driveshaft having an over-running one directional clutch as well as a clutch operable by the pilot) an upright shaft (mounted in suitable opposed anti-friction bearings), on whose upper tip is fixedly attached the annular inner member (having substantially fixed conformation) of a hub assembly of a rotor having multiple long airfoil blades (of suitable conformation having much shorter cross sectional chord dimension than the blade length) symmetrically disposed with respect to each other with their respective longitudinal axes at suitable equal respective angles with respect to corresponding radii from the rotational axis of an outer annular hub member having substantially fixed conformation and providing pivotal at least almost cantilever mountings therein of the respective cylindrical roots of the airfoil blades, whose longitudinal axes respectively are at least almost aligned with the pivotal axes of their respective cylindrical blade roots (attached fixedly and almost but not quite rigidly to the butt ends of the respective blades), each one of which cylindrical roots has fixedly attached to it a pressure lug, to which is fixedly attached a cylindrical finger, whose longitudinal axis is off-center a suitable slight amount with respect to the pivotal axis (in its mounting bracket)

of the blade root to which it is attached, and on which cylindrical finger is slidably mounted the rotationally front tip of a resilient coiled compression spring (all of said springs corresponding in number to the number of blades being equally spaced from the axis of the mounting shaft and symmetrically disposed with respect to each other with their longitudinal axes being at slight angles with respect to a plane perpendicular to said axis), whose longitudinal axis in ordinary engine powered flight is disposed at almost right angles with respect to the pivotal axis of its respective blade root, and whose rear tip correspondingly is slidably mounted on a cylindrical mounting finger fixedly attached to a pressure surface, against which the rear end of the coiled compression spring rests, and which pressure surface is mounted on a platform generally perpendicularly disposed with respect to said mounting shaft, around which said platform is not rotatable, but with respect to which the rigid outer annular hub member is rotatable within limits of several degrees around the inner annular hub member rigidly attached to that mounting shaft, on rotation of which each of the resilient springs tends to rotate (intermediate said rotational limits and around the axis of the rotor-mounting shaft) the respective blade root to which its front tip is attached as above described at a point just sufficiently below the pivotal axis of said cylindrical blade root on its cantilever mounting in the almost rigid outer annular hub member to exert proper torque around said pivotal axis of the blade root just sufficient to maintain suitable angle of attack of the blade (subject to drag and lift of the surrounding air on the trailing segment thereof with respect to the pivotal axis of the cylindrical blade root during orbital rotation in a path at least almost perpendicular to the rotational axis of the mounting shaft) exactly commensurate with the amount of torque being exerted on the rotor-mounting shaft by the engine (whether said engine be operating at substantially full power capacity, or only a fraction of its full capacity, or not at all), the resiliency of the said coiled compression springs also serving to vary the angles of attack of the said blades individually and cyclically during passage of the blades through cross currents of air with respect to the axis of the rotor-mounting shaft (as during rapid forward translational flight of the aircraft) in addition to collectively absorbing by the combined resilient springs of rotational shock of the outer annular hub member (providing almost cantilever mounting therein of the blade roots) on the inner annular hub member (fixedly mounted on the upper tip of said shaft) during any rapid rotational acceleration of the rotor by the torque of the engine on the rotor-mounting shaft.

References Cited

UNITED STATES PATENTS

| | | | |
|---|---|---|---|
| 2,646,130 | 7/1953 | Udelman | 170—135.22 |
| 2,771,143 | 11/1956 | Campbell | 170—135.22 |

MILTON BUCHLER, Primary Examiner

P. E. SAUBERER, Assistant Examiner

U.S. Cl. X.R.

70—135.22, 160.25, 160.53